United States Patent
Tamir et al.

(10) Patent No.: US 8,416,355 B2
(45) Date of Patent: Apr. 9, 2013

(54) DIRECTIONAL FILTER DEVICE FOR CONTROLLING DIRECTION OF MAXIMAL BLOCKING OF INCIDENT LIGHT

(75) Inventors: Zeev Tamir, Haifa (IL); Yacov Cohen, Haverhill, MA (US)

(73) Assignee: TC View Ltd., Katzrin (IL)

( * ) Notice: Subject to any disclaimer, the term of this patent is extended or adjusted under 35 U.S.C. 154(b) by 0 days.

(21) Appl. No.: 12/601,982

(22) PCT Filed: Jun. 18, 2008

(86) PCT No.: PCT/IL2008/000831
§ 371 (c)(1),
(2), (4) Date: Nov. 25, 2009

(87) PCT Pub. No.: WO2008/155767
PCT Pub. Date: Dec. 24, 2008

(65) Prior Publication Data
US 2010/0177255 A1    Jul. 15, 2010

Related U.S. Application Data

(60) Provisional application No. 60/929,268, filed on Jun. 20, 2007.

(51) Int. Cl.
*G02F 1/13* (2006.01)
*G02F 1/1335* (2006.01)

(52) U.S. Cl. ......... 349/18; 356/73.1; 356/138; 349/114; 349/1; 250/205; 345/32

(58) Field of Classification Search ............... 349/18; 359/63, 66, 502, 491.01
See application file for complete search history.

(56) References Cited

U.S. PATENT DOCUMENTS

| | | | |
|---|---|---|---|
| 4,621,898 A | | 11/1986 | Cohen |
| 5,076,669 A | * | 12/1991 | Black et al. .................. 349/1 |
| 5,612,780 A | * | 3/1997 | Rickenbach et al. ......... 356/73.1 |
| 6,222,509 B1 | * | 4/2001 | Ohsawa et al. ............... 345/32 |
| 6,992,826 B2 | | 1/2006 | Wang |
| 7,009,665 B2 | | 3/2006 | Li et al. |

(Continued)

FOREIGN PATENT DOCUMENTS

| CH | 532261 | 12/1972 |
|---|---|---|
| CH | 532261 | 2/1973 |

(Continued)

OTHER PUBLICATIONS

EPC Appln. No. 08 76 3589.2 Office Action issued Mar. 3, 2011, 5 pages.

(Continued)

*Primary Examiner* — Huyen Ngo

(57) ABSTRACT

A directional filter device for controlling direction of maximal blocking of incident light, including: (a) a front polarizer; (b) a plurality of front electrodes; (c) a liquid crystal layer having a front surface for receiving light and a back surface for emitting light; (d) a plurality of back electrodes; (e) a back polarizer; and (f) circuitry for applying a voltage between said front electrodes and said back electrodes, wherein said circuitry is configured to apply voltage between front and back electrodes that do not face each other using voltage sequences that create electric fields at angles selected from a range of angles, which are not perpendicular to the front surface of the liquid crystal layer.

20 Claims, 12 Drawing Sheets

U.S. PATENT DOCUMENTS

| | | | |
|---|---|---|---|
| 7,154,657 | B2 | 12/2006 | Poll et al. |
| 7,531,776 | B2 * | 5/2009 | Koide ............................ 250/205 |
| 2006/0209250 | A1 | 9/2006 | Holmes |
| 2007/0031097 | A1 | 2/2007 | Heikenfeld et al. |
| 2009/0122301 | A1 * | 5/2009 | Wada ............................ 356/138 |

FOREIGN PATENT DOCUMENTS

| | | |
|---|---|---|
| EP | 0122830 | 6/1987 |
| EP | 0151703 | 1/1989 |
| EP | 0658780 | 6/1995 |
| WO | WO 2008/155767 | 12/2008 |

OTHER PUBLICATIONS

EPC Appln. No. 08 76 3589.2 Response to Sep. 2010 EU Action, 5 pages.

EPC Appln. No. 08 76 3589.2 Supplemental Search report issued Sep. 9, 2010, 10 pages.

Communication Pursuant to Article 94(3) EPC Dated Sep. 30, 2011 From the European Patent Office Re. Application No. 08763589.2.

Communication Pursuant to Rule 70(2) and 70a(2) EPC Dated Sep. 28, 2010 From the European Patent Office Re. Application No. 08763589.2.

International Preliminary Report on Patentability Dated Jan. 19, 2010 From the International Bureau of WIPO Re. Application No. PCT/IL2008/000831.

International Search Report and the Written Opinion Dated Jan. 29, 2009 From the International Searching Authority Re. Application No. PCT/IL2008/000831.

Invitation Pursuant to Rule 62a(1) EPC Dated Jun. 9, 2010 From the European Patent Office Re. Application No. 08763589.2.

Response Dated Mar. 3, 2011 to Communication Pursuant to Rule 70(2) and 70a(2) EPC of Sep. 28, 2010 From the European Patent Office Re. Application No. 08763589.2.

Response Dated Oct. 16, 2010 to Invitation Pursuant to Rule 62a(1) EPC Dated Jun. 9, 2010 From the European Patent Office Re. Application No. 08763589.2.

Supplementary European Search Report and the European Search Opinion Dated Sep. 9, 2010 From the European Patent Office Re. Application No. 08763589.2.

* cited by examiner

DIRECTIONAL FILTER DEVICE FOR CONTROLLING DIRECTION OF MAXIMAL BLOCKING OF INCIDENT LIGHT

CROSS REFERENCE TO RELATED APPLICATIONS

Applicants hereby claim priority under 35 USC 119, 120, 365 on the prior filed U.S. Provisional Application 60/929, 268, filed 20 Jun. 2007, and also International application PCT/IL2008/000831, filed 18 Jun. 2008, the entire contents of PCT/IL2008/00831 are incorporated herein by reference.

FIELD OF THE INVENTION

The present invention relates to a method and apparatus for varying the transmission of light through said apparatus, where the transmission is a controllable function of the angle of light incidence.

BACKGROUND OF THE INVENTION

LCD or liquid crystal displays have found widespread use in modern television and computer screens, wristwatches, calculators and the like. A large proportion of modern LCD displays are based on the twisted nematic liquid crystal due to Helfirch and Schadt (Swiss patent CH532261). The orientation of light entering the device is twisted by liquid crystals which are oriented in a spiral or corkscrew fashion. Due to polarizers at the entrance and exit of the device, only light that is thus twisted will exit the device. Upon application of an electric field normal to the liquid crystal plane ('up' or 'down' the stairs), the ability of the liquid crystal to twist light orientation is impaired, blocking light from passing through the device and causing the device to appear darker shades of grey for increasing fields, eventually reaching black for a high enough field. Many such individual devices can be fabricated in close proximity to form an LCD screen. Due to the directional nature of the twisted nematic liquid crystals, light incoming from directions off-normal will be less well modulated by the liquid crystal effect mentioned above. Therefore the viewing angle e.g. of laptop screens is reduced. Great effort has been expended to increase the viewing angle of such devices. However this effect can actually be used to advantage, by effectively blocking the light incident from certain angles and allowing the rest to pass. This use of the directional nature of light absorption by liquid crystals is novel and as will be shown below is of great utility in several applications. In brief, since the disclosed apparatus can block incoming light from a particular direction (such as that of the sun) while passing light from other directions, it is capable of reducing glare and increasing the dynamic range of a scene viewed by a camera, a driver, a pilot, a house occupant, etc. Since the system is electronically controlled, an open- or closed-loop feedback system can modify the direction of greatest light attenuation adaptively to track bright objects and keep them blocked.

U. S. patent application 20060209250 discloses a beam steering device using a liquid crystal with an array of back electrodes. Voltages are applied to the array to cause a desired phase distribution across the array, the distribution being selected to steer a beam incident upon the array into a desired direction. Reflective elements are disposed to reflect light incident in the spaces between the electrodes to reduce losses and to smooth the transitions in phase between adjacent electrodes. However the system is not adapted for the selective transmission or absorption of light based on angle of incidence, but rather to steer a beam incident from a known direction in a controlled fashion.

European patent EP0151703 discloses a directional filter for ambient light constructed from a thin base strip of indeterminate length and having an opaque surface. The strip is wound into a roll having a plurality of convolutions and sections are cut from the face of the roll. A pair of sections are disposed so that their convolutions are in an orthogonal configuration, and are sandwiched between a pair of glass plates having non-reflective outside surfaces. Channels are thereby provided, which impart directional characteristics to the ambient light. However the system is not adapted for the selective transmission or absorption of light based on angle of incidence, but rather to passively impart directional characteristics to the incoming light.

Similarly European patent EP0658780 discloses a directional filter, characterized by a plurality of lamellae which form mutually parallel beam wells, the interspaces being filled by transparent support bodies whose refractive index causes the incident light to be refracted towards the normal on the plane of incidence. Again the system is not adapted for the selective transmission or absorption of light based on angle of incidence, but rather to passively impart directional characteristics to the incoming light. Patents EP0122830 and U.S. Pat. No. 4,621,898 follow similar lines to EP0658780.

Hence, a system for a directional filter is still a long felt need.

BRIEF DESCRIPTION OF THE DRAWINGS

In order to understand the invention and to see how it may be implemented in practice, a plurality of embodiments will now be described, by way of non-limiting example only, with reference to the accompanying drawings, in which FIG. 1 schematically presents a standard twisted nematic liquid crystal display (LCD).

SUMMARY OF THE INVENTION

Figure 1:
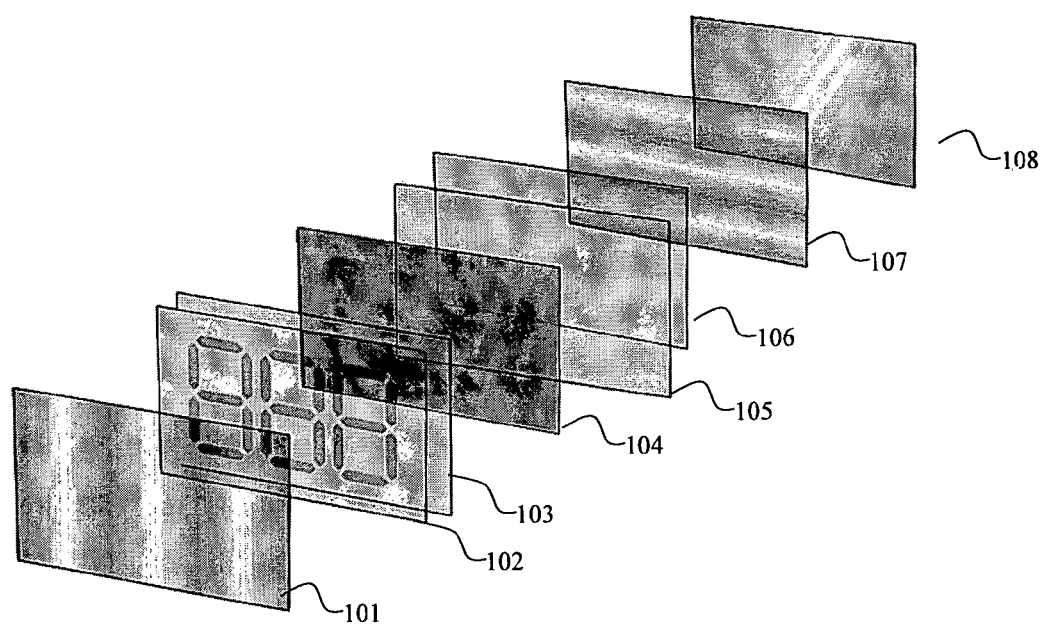

It is one object of the present invention to provide a multi layer directional filter comprising:
a. a front polarizer;
b. a front glass plate provided with a plurality of transparent, individually addressable upper electrodes and addressing lines, said front glass plate being disposed behind said front polarizer;

c. a front transparent insulating layer, said front transparent insulating layer being disposed behind said front glass plate;

d. a middle liquid crystal layer containing liquid crystal molecules, said liquid crystal molecules having an electric dipole moment, said middle liquid crystal layer being disposed behind said front transparent insulating layer;

e. a hind transparent insulating layer, said hind transparent insulating layer being disposed behind said middle liquid crystal layer;

f. a hind glass plate provided with a plurality of transparent, individually addressable lower electrodes and addressing lines, said hind glass plate being disposed behind said transparent insulating layer;

g. a hind polarizer, said hind polarizer being disposed behind said hind glass plate; and, h. control circuitry adapted to provide sequences of voltage patterns to said electrodes of said front glass plate and said hind glass plate, said control circuitry being adapted to create electric fields at controllable (i) positions, (ii) directions in space; and, (iii) magnitude;

wherein said control circuitry is adapted to control the directions of stable equilibrium of said liquid crystals, hence controlling the directions of incidence of maximal light absorption for each pixel individually such that the light coming from said direction of incidence is substantially absorbed whilst light coming from all other directions is substantially transmitted.

It is another object of the present invention to provide the directional filter as defined above, wherein said front and back insulating layers are additionally provided with a series of grooves in the directions of said front and back polarizers, respectively.

It is another object of the present invention to provide the directional filter as defined above, wherein said electrodes are composed of indium tin oxide.

It is another object of the present invention to provide the directional filter as defined above, wherein said transparent insulating layers are comprised of polyimide material.

It is another object of the present invention to provide the directional filter as defined above, wherein said individually addressable upper and lower electrodes each assume two-dimensional configurations of rows and columns, and wherein said control circuit addresses electrodes belonging to a given row together and applies a single common voltage to all said electrodes of said row in a given phase, and in other temporal phases electrodes belonging to the same column are addressed together and supplied with a common voltage, allowing for two-dimensional control over said direction of incidence of maximal light absorption.

It is another object of the present invention to provide the directional filter as defined above, wherein the voltages applied to a subset of said individually addressable upper and lower electrodes is of a magnitude less than that required for complete alignment of liquid crystal molecules' orientations parallel to the applied field, thereby further modifying said direction of incidence of maximal light absorption.

It is another object of the present invention to provide the directional filter as defined above, wherein said electric field, magnitude and direction is independently controlled by said control circuitry.

It is another object of the present invention to provide the directional filter as defined above, wherein said electric field magnitude and direction is shared by groups of electrodes (pixels).

It is another object of the present invention to provide the directional filter as defined above, wherein said groups of electrodes are adjacent.

It is another object of the present invention to provide the directional filter as defined above, said groups of electrodes occupy arbitrary locations.

It is another object of the present invention to provide the directional filter as defined above, wherein the entire set of said upper electrodes are addressed together, and/or wherein the entire set of said lower electrodes are addressed together.

It is another object of the present invention to provide the directional filter as defined above, wherein said voltage pattern comprises a set of N distinct voltages applied to subsets of said individually addressable upper and lower electrodes, where N is an integer greater than zero.

It is another object of the present invention to provide the directional filter as defined above, wherein said voltage pattern additionally comprises a set of M distinct patterns applied over time, where M is an integer greater than zero.

It is another object of the present invention to provide the directional filter as defined above, wherein said front polarizer is oriented with a polarization direction perpendicular to that of said hind polarizer.

It is another object of the present invention to provide the directional filter as defined above, wherein said front polarizer is oriented with a polarization direction parallel to that of said hind polarizer.

It is another object of the present invention to provide the directional filter as defined above, wherein said front polarizer is oriented with a polarization direction aligned in an arbitrary direction with respect to said hind polarizer.

It is another object of the present invention to provide the directional filter as defined above, wherein said addressing lines on said upper electrodes are oriented perpendicular to the said addressing lines of said lower electrodes.

It is another object of the present invention to provide the directional filter as defined above, wherein said directional filter is additionally provided with a power source selected from a group consisting of: photovoltaic cells, primary voltaic cells, secondary voltaic cells, and one or more adapters facilitating connection to external power sources.

It is another object of the present invention to provide the directional filter as defined above, wherein said directional filter is additionally provided with a direction-sensitive light detector in communication with said control circuitry, said control circuitry being adapted to utilize the direction and intensity information obtained from said direction-sensitive light detector to change said direction of incidence of maximal light absorption.

It is another object of the present invention to provide the directional filter as defined above, wherein said control circuitry is adapted for minimizing flare effect.

It is another object of the present invention to provide the directional filter as defined above, wherein said control circuitry controls said direction of incidence of maximal light absorption by means of a closed loop algorithm adapted for minimizing error in said direction of incidence of maximal light absorption.

It is another object of the present invention to provide the directional filter as defined above, wherein the pixels are addressed by a pixel addressing mechanism selected from a group consisting of: passive, active, TFT, or combinations thereof.

It is another object of the present invention to provide the directional filter as defined above, wherein a first spatial axis of the electric field pattern and subsequent liquid crystal alignment is controlled by applying directional fields using a spatial pattern of voltages in the plane of said first axis, while a second spatial axis the electric field pattern and subsequent liquid crystal alignment is controlled by applying directional fields using a spatial pattern of voltages in the plane of said second axis.

It is another object of the present invention to provide the directional filter as defined above, wherein one spatial axis of the electric field pattern is controlled by applying a directional field using a spatial pattern of voltages, while the other (orthogonal) spatial axis is controlled by varying the magnitude of applied voltage, thereby achieving two-dimensional control without requiring individual addressing of each pixel in both dimensions.

It is another object of the present invention to provide the directional filter as defined above, wherein the sequence of voltages applied to said top and bottom electrodes occurs in several temporal phases and in repetitive patterns that induce at the liquid crystal layer electric fields that in a given temporal phase are oriented nearly in the same absolute direction, and wherein the polarity of said electric fields may be reversed without affecting the said absolute direction.

It is another object of the present invention to provide the directional filter as defined above, wherein two or more of said voltage patterns applied to said top and bottom electrodes induce at the liquid crystal layer electric fields that have nearly the same said absolute direction and induce temporal averages of the local absolute magnitudes of the electric fields along the liquid crystal layer that are relatively uniform.

It is another object of the present invention to provide the directional filter as defined above, wherein the sequences of voltages applied to the top and bottom electrodes is alternating in several temporal phases so as to induce at the liquid crystal molecules alternating rotational torques in a rate fast enough relative to the rotational response time of the liquid crystal molecules so that the said molecules will assume a desired spatial orientation of their long axes.

It is another object of the present invention to provide the directional filter as defined above, wherein said voltage patterns applied to the top and bottom electrodes alternate between several phases so as to induce at the liquid crystal molecules alternating rotational torques in a rate fast enough relative to the rotational response time of the liquid crystal molecules so that the spatial orientations of the long axes of said molecules will be stable in time.

It is another object of the present invention to provide the directional filter as defined above, wherein said voltage patterns applied to said top and bottom electrodes alternate in several temporal phases so as to induce on said liquid crystal molecules alternating rotational torques that orient the long axes of said molecules in a uniform desired spatial direction throughout the volume of the said liquid crystal layer.

It is another object of the present invention to provide the directional filter as defined above, wherein said directional filter has a shape selected from a group consisting of: planar, simple curve, compound curve.

It is another object of the present invention to provide the directional filter as defined above, wherein said upper and lower electrodes take the form of parallel, conductive stripes.

It is another object of the present invention to provide the directional filter as defined above, wherein said sequences of voltage patterns are applied in time periods less than the mechanical rotational time constant of said liquid crystal molecules.

It is another object of the present invention to provide a multi layer directional filter comprising:

a. a front glass plate provided with a plurality of transparent, individually addressable upper electrodes and addressing lines;

b. a front transparent insulating layer, said front transparent insulating layer being disposed behind said front glass plate;

c. a middle liquid crystal layer containing droplets of liquid crystal molecules dispersed in a polymer matrix, said middle polymer-dispersed liquid crystal layer being disposed behind said front transparent insulating layer;

d. a hind transparent insulating layer, said hind transparent insulating layer being disposed behind said middle polymer-dispersed liquid crystal layer;

e. a hind glass plate provided with a plurality of transparent, individually addressable lower electrodes and addressing lines, said hind glass plate being disposed behind said transparent insulating layer;

f. control circuitry adapted to provide sequences of voltage patterns to said electrodes of said front glass plate and said hind glass plate, said control circuitry being adapted to create electric fields of controllable (i) positions, (ii) directions in space; and, (iii) magnitudes;

wherein said control circuitry is adapted to control the direction of incidence of maximal light scattering for each pixel individually such that the light coming, from said direction of incidence is substantially scattered whilst light coming from all other directions is substantially transmitted.

It is another object of the present invention to provide the directional filter as defined above, wherein said upper and lower electrodes take the form of parallel, conductive stripes.

It is another object of the present invention to provide the directional filter as defined above, wherein said sequences of voltage patterns are applied in time periods less than the mechanical rotational time constant of the liquid crystal molecules.

It is another object of the present invention to provide the directional filter as defined above, wherein said polymer-dispersed liquid crystals' molecules are rotated in time by means of said voltage patterns applied by said control circuitry.

It is another object of the present invention to provide the directional filter as defined above, wherein said polymer-dispersed liquid crystals molecules' orientations are switched in time by means of said voltage patterns applied by said control circuitry.

It is another object of the present invention to provide the directional filter as defined above, wherein said polymer-dispersed liquid crystals are stationary and directionally controlled by means of said voltage patterns applied by said control circuitry.

It is another object of the present invention to provide the directional filter as defined above, additionally supplied with side electrodes in communication with said control circuitry, wherein said side electrodes can create electric fields parallel to the plane of the layers of the device.

It is another object of the present invention to provide the directional filter as defined above, wherein said transparent upper and lower electrodes are comprised of resistive material, thereby allowing currents to flow through said resistive material over which a voltage drop will occur, creating electric fields with a controllable degree of tilt.

It is another object of the present invention to provide the directional filter as defined above, wherein said directional filter is additionally provided:
  a. zero or more additional glass layers, each said additional glass layer being provided with a plurality of transparent, individually addressable electrodes;
  b. zero or more additional transparent insulating layers, each said transparent insulating layer being disposed adjacent to said glass layer;
  c. zero or more additional liquid-crystal containing layers disposed between each of said additional transparent insulating layers; and
  d. zero or more additional polarizing layers, said additional polarizing layers being disposed in front of or behind said additional glass layers,
wherein said additional glass, transparent insulating, liquid crystal, and polarizing layers serve to increase and/or decrease the range of direction of incidence for which light intensity is attenuated, and can further serve to block more than one direction of incidence simultaneously, or can further serve to nullify redundant attenuated directions.

It is another object of the present invention to provide the directional filter as defined above, wherein the ratio between the size of said electrodes in their largest dimension to the distance between said upper and lower electrodes is adapted to control the nonlinearities of the electric fields produced by said electrodes.

It is another object of the present invention to provide the directional filter as defined above, wherein said direction-sensitive light detector is selected from a group consisting of: a four-quadrant light sensor, a light detector array of S sensors where S is an integer greater than 0; a low resolution imaging device; a CMOS imaging device; a CCD imaging device; a set of light sensors; an array of photovoltaic cells; and any device with directional and amplitude sensitivity to incident light.

It is another object of the present invention to provide the directional filter as defined above, wherein said control circuitry is adapted to track the light sources of greatest intensity and attenuate the light incident from said light sources by means of orienting the liquid crystals of said middle liquid crystal layer in such a direction as to maximally attenuate the light coming from said sources of greatest intensity, if the intensity of said light sources is above a given intensity threshold.

It is another object of the present invention to provide the directional filter as defined above, adapted to selectively block the light incident upon an optical instrument selected from a group consisting of: camera lens, sunglasses, car windshield visor, motorcycle helmet visor, welding helmet and smart window.

It is another object of the present invention to provide the directional filter as defined above, adapted to selectively block the light incident upon an optical instrument selected from a group consisting of: camera lens, still camera, video camera, sunglasses, vehicle windshield visor, vehicle visor, motorcyclist helmet visor, welding helmet, window, and smart window.

It is another object of the present invention to provide an apparatus for increasing optical dynamic range comprising:
  a. a front polarizer;
  b. a front glass plate provided with a plurality of transparent, individually addressable upper electrodes and addressing lines, said front glass plate being disposed behind said front polarizer;
  c. a front transparent insulating layer, said front transparent insulating layer being disposed behind said front glass plate;
  d. a middle liquid crystal layer containing liquid crystal molecules, said middle liquid crystal layer being disposed behind said front transparent insulating layer;
  e. a hind transparent insulating layer, said hind transparent insulating layer being disposed behind said middle liquid crystal layer;
  f. a hind glass plate provided with a plurality of transparent, individually addressable lower electrodes and addressing lines, hind glass plate being disposed behind said transparent insulating layer;
  g. a hind polarizer, said hind polarizer being disposed behind said hind glass plate; and,
  h. control circuitry adapted to provide sequences of voltage patterns to said electrodes of said front glass plate and said hind glass plate, said control circuitry being, adapted to create electric fields at controllable (i) positions, (ii) directions in space; and, (iii) magnitude;
  wherein said control circuitry is adapted to substantially reduce the transmitted light amplitude coming from the direction of greatest incident radiation, thereby increasing the optical dynamic range of transmitted light.

It is another object of the present invention to provide the directional filter as defined above, wherein said front and back insulating layers are additionally provided with a series of grooves in the directions of said front and back polarizers, respectively.

It is another object of the present invention to provide the directional filter as defined above, wherein the refractive index of the PDLC matrix $n_p$ is similar to the ordinary refractive index of the liquid crystal material $n_o$, and wherein both said $n_p$ and said $n_o$ differ from the extraordinary index of the liquid crystal material $n_e$.

It is another object of the present invention to provide the directional filter as defined above, wherein said voltage sequences are supplied to said upper and lower electrodes so chosen to provide a sequence of electric fields such that the directions of stable equilibrium orientations of said liquid crystal molecules are maintained orthogonal to the direction of required maximal scattering.

It is another object of the present invention to provide the directional filter as defined above, wherein the orientation of said liquid crystal molecules is rotated in time while maintaining orthogonal orientation relative to the direction of required maximal scattering.

It is another object of the present invention to provide a privacy-maintaining window for buildings or other applications comprising:
  a. a light source disposed outside a window of said building;
  b. a series of transparent and/or partially mirrored, reflecting surfaces, disposed outside said window of said building;
wherein said series of reflecting surfaces act to reflect the light from said light source towards the outside of said building, while allowing light from outside said building to enter said window, thus allowing occupant(s) of said building to see out of said building while preventing those outside from seeing inside said building.

It is another object of the present invention to provide a method for directional filtering of light. The method comprising steps selected inter alia from
  a. obtaining a front polarizer;
  b. obtaining a front glass plate having a plurality of transparent, individually addressable upper electrodes and addressing lines;
  c. disposing said front glass plate behind said front polarizer;

d. obtaining a front transparent insulating layer;
e. disposing said front transparent insulating layer behind said front glass plate;
f. obtaining a middle liquid crystal layer having liquid crystal molecules;
g. disposing said middle liquid crystal layer behind said front transparent insulating layer;
h. obtaining a hind transparent insulating layer;
i. disposing said hind transparent insulating layer behind said middle liquid crystal layer;
j. obtaining a hind glass plate provided with a plurality of transparent, individually addressable lower electrodes and addressing lines;
k. disposing said hind glass plate behind said transparent insulating layer;
l. obtaining a hind polarizer;
m. disposing said hind polarizer behind said hind glass plate; and,
n. obtaining control circuitry;
o. providing sequences of voltage patterns by said control circuitry to said electrodes of said front glass plate and said hind glass plate; thereby creating electric, fields at controllable (i) positions, (ii) directions in space; and, (iii) magnitude;
  wherein said control circuitry controls the direction of incidence of maximal light absorption for each pixel individually such that the light coming from said direction of incidence is substantially absorbed whilst light coming from other directions is substantially transmitted.

It is another object of the present invention to provide the method as defined above, wherein said front and back insulating layers are, additionally provided with a series of grooves in the directions of said front and back polarizers, respectively.

It is another object of the present invention to provide the method as defined above, wherein said electrodes are composed of indium tin oxide.

It is another object of the present invention to provide the method as defined above, wherein said transparent insulating layers are comprised of polyimide material.

It is another object of the present invention to provide the method as defined above, wherein said individually addressable upper and lower electrodes assume a two-dimensional configuration, allowing for two-dimensional control over said direction of incidence of maximal light absorption.

It is another object of the present invention to provide the method as defined above, wherein said individually addressable upper and lower electrodes are addressed in rows and columns, and wherein electrodes belonging to the same row or column are applied a common voltage, allowing for two-dimensional control over said direction of incidence of maximal light absorption.

It is another object of the present invention to provide the method as defined above, wherein the voltages applied to a subset of said individually addressable upper and lower electrodes is of a magnitude less than that required for complete alignment of liquid crystal molecules' orientations parallel to the applied field, thereby further modifying said direction of incidence of maximal light absorption.

It is another object of the present invention to provide the method as defined above, wherein said electric field magnitude and direction is independently controlled by said control circuitry.

It is another object of the present invention to provide the method as defined above, wherein said electric field magnitude and direction is shared by groups of pixels.

It is another object of the present invention to provide the method as defined above, wherein said groups of pixels are adjacent.

It is another object of the present invention to provide the method as defined above, wherein said groups of pixels occupy arbitrary locations.

It is another object of the present invention to provide the method as defined above, wherein the entire set of said upper electrodes are addressed together, and/or wherein the entire set of said lower electrodes are addressed together.

It is another object of the present invention to provide the method as defined above, wherein said voltage pattern comprises a set of N distinct voltages applied to subsets of said individually addressable upper and lower electrodes, where N is an integer greater than zero.

It is another object of the present invention to provide the method as defined above, wherein said voltage pattern additionally comprises a set of M distinct patterns applied over time, where M is an integer greater than zero.

It is another object of the present invention to provide the method as defined above, wherein said front polarizer is oriented with a polarization direction perpendicular to that of said hind polarizer.

It is another object of the present invention to provide the method as defined above, wherein said front polarizer is oriented with a polarization direction parallel to that of said hind polarizer.

It is another object of the present invention to provide the method as defined above, wherein said front polarizer is oriented with a polarization direction aligned in an arbitrary direction with respect to said hind polarizer.

It is another object of the present invention to provide the method as defined above, wherein said addressing lines on said upper electrodes are oriented perpendicular to the said addressing lines of said lower electrodes.

It is another object of the present invention to provide the method as defined above, wherein said directional filter is additionally provided with a power source selected from a group consisting of: photovoltaic cells, primary voltaic cells, secondary voltaic cells, and one or more adapters facilitating connection to external power sources.

It is another object of the present invention to provide the method as defined above, wherein said directional filter is additionally provided with a direction-sensitive light detector in communication with said control circuitry, said control circuitry being adapted to utilize the direction and intensity information obtained from said direction-sensitive light detector to change said direction of incidence of maximal light absorption.

It is another object of the present invention to provide the method as defined above, wherein the pixels are addressed by a pixel addressing mechanism selected from a group consisting of: passive, active, TFT, or combinations thereof.

It is another object of the present invention to provide the method as defined above, wherein one axis of the electric field pattern is controlled by applying a directional field using a spatial pattern of voltages, while the other axis is controlled by varying the magnitude of applied voltage, thereby achieving two-dimensional control without requiring individual addressing of each pixel in both dimensions.

It is another object of the present invention to provide a method for directional filtering of incoming light. The method comprising step selected inter alia from:
  a. obtaining a front glass plate provided with a plurality of transparent, individually addressable upper electrodes and addressing lines;
  b. obtaining a front transparent insulating layer, c. disposing said front transparent insulating layer behind said front glass plate;
d. obtaining a middle liquid crystal layer containing droplets of liquid crystal molecules dispersed in a polymer matrix,
e. disposing said middle polymer-dispersed liquid crystal layer behind said front transparent insulating layer;
f. obtaining a hind transparent insulating layer,
g. disposing said hind transparent insulating layer behind said middle liquid crystal layer;
h. obtaining a hind glass plate provided with a plurality of transparent, individually addressable lower electrodes and addressing lines,
i. disposing said hind glass plate being behind said transparent insulating layer;
j. obtaining control circuitry adapted to provide sequences of voltage patterns to said electrodes of said front glass plate and said hind glass plate, said control circuitry being adapted to create electric fields at controllable (i) positions, (ii) directions in space; and, (iii) magnitude;
wherein said control circuitry controls the direction of incidence of maximal light scattering for each pixel individually such that the light coming from said direction of incidence is substantially scattered whilst light coming from all other directions is substantially transmitted.

It is another object of the present invention to provide the method as defined above, wherein said upper and lower electrodes take the form of parallel, conductive stripes.

It is another object of the present invention to provide the method as defined above, wherein said individually addressable upper and lower electrodes in some of the temporal phases of addressing the electrodes, electrodes belonging to the same row are fed with the same voltage, and in other temporal phases of addressing the electrodes, electrodes belonging to the same column are fed with the same voltage, allowing for two-dimensional control over said direction of incidence of maximal light absorption.

It is another object of the present invention to provide the method as defined above, wherein said sequences of voltage patterns are applied in time periods less than the mechanical time constant of the liquid crystal molecules.

It is another object of the present invention to provide the method as defined above, wherein said polymer-dispersed liquid crystals are rotated in time by means of said voltage patterns applied by said control circuitry.

It is another object of the present invention to provide the method as defined above, wherein said polymer-dispersed liquid crystals are switched in time by means, of said voltage patterns applied by said control circuitry.

It is another object of the present invention to provide the method as defined above, wherein said polymer-dispersed liquid crystals are stationary and directionally controlled by means of said voltage patterns applied by said control circuitry.

It is another object of the present invention to provide the method as defined above, additionally supplied with side electrodes in communication with said control circuitry, wherein said side electrodes can create electric fields parallel to the plane of the layers of the device.

It is another object of the present invention to provide the method as defined above, wherein said transparent upper and lower electrodes are comprised of resistive material, thereby allowing currents to flow through said resistive material over which a voltage drop will occur, creating electric fields with a controllable degree of tilt.

It is another object of the present invention to provide the method as defined above, wherein said method comprising of additional steps of providing with zero or more additional glass layers, each said additional glass layer being provided with a plurality of transparent, individually addressable electrodes; zero or more additional transparent insulating layers, each said transparent insulating layer being disposed adjacent to said glass layer; zero or more additional liquid-crystal containing layers disposed between each of said additional transparent insulating layers; and zero or more additional polarizing layers, said additional polarizing layers being disposed in front of or behind said additional glass layers, wherein said additional glass, transparent insulating, liquid crystal, and polarizing layers serve to increase and/or decrease the range of direction of incidence for which light intensity is attenuated, and can further serve to block more than one direction of incidence simultaneously, or serve to nullify redundant attenuated directions.

It is another object of the present invention to provide the method as defined above, wherein said direction-sensitive light detector is selected from a group consisting of: a four-quadrant light sensor, a light detector array of S sensors where S is an integer greater than 0; a low resolution imaging device; a CMOS imaging device; a CCD imaging device; a set of light sensors; an array of photovoltaic cells; and any device with directional and amplitude sensitivity to incident light.

It is another object of the present invention to provide the method as defined above, wherein said control circuitry is adapted to track the light sources of greatest intensity and attenuate the light incident from said light sources by means of orienting the liquid crystals of said middle liquid crystal layer in such a direction as to maximally attenuate the light coming from said sources of greatest intensity, if the intensity of said light sources is above a given intensity threshold.

It is another object of the present invention to provide the method as defined above, adapted to selectively block the light incident upon an optical instrument selected from a group consisting of: camera lens, sunglasses, car windshield visor, motorcycle helmet visor, welding helmet and smart window.

It is another object of the present invention to provide the method as defined above, adapted to selectively block the light incident upon an optical instrument selected from a group consisting of: camera lens, still camera, video camera, sunglasses, vehicle windshield visor, vehicle visor, motorcyclist helmet visor, welding helmet, window and smart window.

It is another object of the present invention to provide a method for maintain privacy in buildings comprising:
  a. a light source disposed outside a window of said building;
  b. a series of reflecting surfaces, transparent and/or partially mirrored, disposed outside said window of said building;
wherein said series of reflecting surfaces act to reflect the light from said light source towards the outside of said building, while allowing light from outside said building to enter said window, thus allowing occupant(s) of said building to see out of said building while preventing those outside from seeing inside said building.

It is another object of the present invention to provide a method for increasing optical dynamic range. The method comprising steps selected inter alia from:
  a. providing a front polarizer;
  b. providing a front glass plate provided with a plurality of transparent, individually addressable upper electrodes and addressing lines, said front glass plate being disposed behind said front polarizer;

c. providing a front transparent insulating layer, said front transparent insulating layer being disposed behind said front glass plate;

d. providing a middle liquid crystal layer containing liquid crystal molecules, said middle liquid crystal layer being disposed behind said front transparent insulating layer;

e. providing a hind transparent insulating layer, said hind transparent insulating layer being disposed behind said middle liquid crystal layer;

f. providing a hind glass plate provided with a plurality of transparent, individually addressable lower, electrodes and addressing lines, said hind glass plate being disposed behind said transparent insulating layer;

g. providing a hind polarizer, said hind polarizer being disposed behind said hind glass plate; and, h. providing control circuitry adapted to provide sequences of voltage patterns to said electrodes of said front glass plate and said hind glass plate, said control circuitry being adapted to create electric fields at controllable (i) positions, (ii) directions in space; and, (iii) magnitude; wherein said control circuitry substantially reduces the transmitted light amplitude coming from the direction of greatest incident radiation, thereby increasing the optical dynamic range of transmitted light.

It is another object of the present invention to provide the method as defined above, wherein said light absorbing pigment(s) are dispersed within the volume of said polymer matrix, and/or are dispersed within any material of said directional filter, and/or are dispersed at any boundary between materials of said directional filter.

It is still an object of the present invention to provide the method as defined above, wherein a polarizing polymer (or other polarizing material) is included within said polymer matrix, said polarizing polymer being so oriented to absorb light that has an electric field component normal to the plane defined by said polymer dispersed liquid crystal layer.

It is lastly an object of the present invention to provide the method as defined above, wherein said polymer matrix is made from a polarizing polymer material or other light-polarizing material, and wherein said polarizing material is so oriented as to absorb light that has an electric field component normal to the plane defined by the said polymer dispersed liquid crystal layer.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF PREFERRED EMBODIMENTS

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a directional filter.

In the following detailed description, numerous specific details are set forth in order to provide a thorough understanding of embodiments of the present invention. However, those skilled in, the art will understand that such embodiments may be practiced without these specific details. Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments. Lastly, the terms "comprising", "including", "having", and the like, as used in the present application, are intended to be synonymous.

The term 'LC' refers hereinafter to liquid crystal, including birefringent liquid crystals and twisted nematic liquid crystals.

The term 'smart window' refers hereinafter to a window or panel that highly absorbs or highly scatters light incident from a selected spatial direction.

The term 'privacy maintaining window' refers to a window that allows occupants inside a building to see out but prevents people on the outside from seeing in.

The term 'LCD' refers hereinafter to liquid crystal display or to any electro-optic panel based on liquid crystal material.

The term 'plurality' refers hereinafter to any integer number equal or higher 1, e.g, 2-10, especially 2-4.

The notation '$n_o$'—refers hereinafter to the ordinary refractive index of the liquid crystal.

The notation '$n_e$' refers hereinafter to the extraordinary refractive index of the liquid crystal.

The notation '$n_o$' refers hereinafter to the refractive index of the polymer that functions as the matrix. For this discussion $n_p$ is taken to be equal or similar to $n_o$ ($n_p \approx n_o$).

The term 'PDLC' refers hereinafter to Polymer Dispersed Liquid Crystal.

The term 'flare effect' refers hereinafter to non-image forming light that enters an imaging system.

Motivation—Applications

The present invention discloses a set of apparatii and associated methods to control the direction from which incident light is maximally absorbed by an electrooptic device. We call this device a directional filter. Before going into the technical details of the invention, we first motivate the discussion by describing a series of uses for such a system of control over the direction of maximum absorption. In a camera, for instance, it is often the case that one particular object in the frame (such as the sun) has a much greater brightness than the surroundings. The brightness of this object will 'steal' dynamic range from the surroundings causing them to lose contrast they would have in the absence of the bright object. Thus if the bright object could be darkened without darkening the rest of the field of view, full dynamic range would be restored. It will be noticed that a directional filter as described above can achieve just such an effect. If a directional filter as described above is placed over the lens of an ordinary camera, the direction of maximal incident light absorption can be controlled to attenuate the light transmitted from the direction of the sun. Obviously for this implementation it would be advantageous to have a light sensor included in the device, for determining the direction(s) of maximum brightness. Then the direction of maximum attenuation can be dynamically controlled to follow the brightest object(s) in the field of view as it moves.

Similar applications will be obvious to those skilled in the art. Sunglasses that block the sun but keep the rest of the field of view bright are possible with the directional filter. Vehicle visors that attenuate the sun or the top half of the field of view but keep the rest of the field of view bright are likewise possible. Helmet visors as used in arc-welding are possible which will greatly darken the brightest region where a brilliant arc is present, but leave the rest of the field of view bright and clearly visible (unlike today's helmets, which either blacken most of the scene into obscurity, or else leave a blindingly brilliant region which must be avoided lest one suffer retinal damage). Helmet visors for aircraft or motorcycles can be similarly constructed. Smart windows that attenuate the sun but allow otherwise clear viewing may be constructed for use on houses, or in airplane cabins, or the like. Anti-flare or contrast-enhancing filters can be produced as well. (The 'flare effect' in cameras and other imaging system can be avoided. This effect, often appearing as a characteristic polygonal shape with sides dependent on the diaphragm shape, occurs usually near bright objects, when non-image forming light enters the imaging system and is recorded by the image sensor or film. This effect generally lowers overall contrast.)

All of the above devices may be planar or, curved, or may assume any other shape.

Method of Operation

Referring to the prior art of FIG. 1, a twisted nematic LCD comprises six layers. The front polarizer 101 restricts the accepted light to be vertically polarized. Glass layer 102 is provided with transparent electrodes. The polyimide layer 103 underneath it has a 'brushed' surface that tends to align the adjacent nematic liquid crystal molecules (which are generally long and thin) of the liquid crystal layer 104 in a particular direction. This direction is chosen to be vertical for the front polyimide layer 103 and horizontal for the back polyimide layer 105. The crystals in between will try to align themselves to their neighbors resulting in a corkscrew or spiral staircase orientation. The polarization direction of linearly polarized light traveling through such a twisted LC cell follows the rotation of the crystals. Thus in the absence of any further factors (such as an electric field), incoming light will be polarized vertically, travel through the LC cell and thereby become rotated to horizontal polarization, and exit the back polarizer 107. Schadt and Helfrich discovered an electro-optical effect of a twisted LC layer consisting of positive dielectric nematic molecules under the application of electric fields. They found that the capability of the twisted liquid crystal configuration to rotate the polarization direction of light can be abolished by application of an electric field. Thus the two electrodes 102,106create electric fields in the direction perpendicular to the flat surfaces of the device. These electric fields permeate the nematic liquid crystals in layer 104. A back polarizer 107 restricts the light passing through this layer to those that are horizontally polarized. The back face 108 may be transparent to allow the light to continue through (in the case of a filter or backlit display) or may be reflective to send the incoming light back to the viewer. Thus in the 'normal' state light will pass through the device of FIG. 1. When an electric field is applied between electrodes 102, 106 however, light will be blocked causing those, areas under the electrodes of layer 102 to appear dark.

For a pixel that is under a certain magnitude of electric field there exists an angle of incident light which experiences maximal absorption, such that for light rays entering the device at said angle, the outgoing light rays due to these incoming rays have minimal intensity. This effect is modified by the magnitude of applied voltage. Thus for an LCD device, especially if it is supplied with less than the nominal voltage the pixel has maximal absorption and appears darkest for a certain angle of the incoming light. The applied voltage to the pixel can be utilized to assist in controlling this direction of maximal light attenuation.

The preferred embodiment of the present invention consists of controlling the direction of maximum absorption by controlling electric field (direction and magnitude) within the liquid crystal material, preferably in two directions (2 degrees of freedom in direction and one in magnitude). The light absorption will be highest at a direction which is a function of the field's direction, of the field's magnitude, and of parameters of the LCD device. This is in contrast to the operation of today's LC-based devices, which rely on fields perpendicular to the device faces, and which cannot selectively control the directions of light absorption and transmission.

In one embodiment of the invention control over the electric field amplitude and direction is provided independently for each pixel separately. In a second embodiment, control over electric field amplitude and direction is shared by groups of adjacent pixels. In a third embodiment of the invention, control over electric field amplitude and direction is shared by arbitrary groups of pixels. In a fourth embodiment of the invention, control over the electric field amplitude and direction is common to the entire liquid crystal sheet. For all of the above embodiments various spatial locations of the (transparent) electrodes are utilized, and various voltages are applied in a time sequence to said electrodes.

Figure 2A:
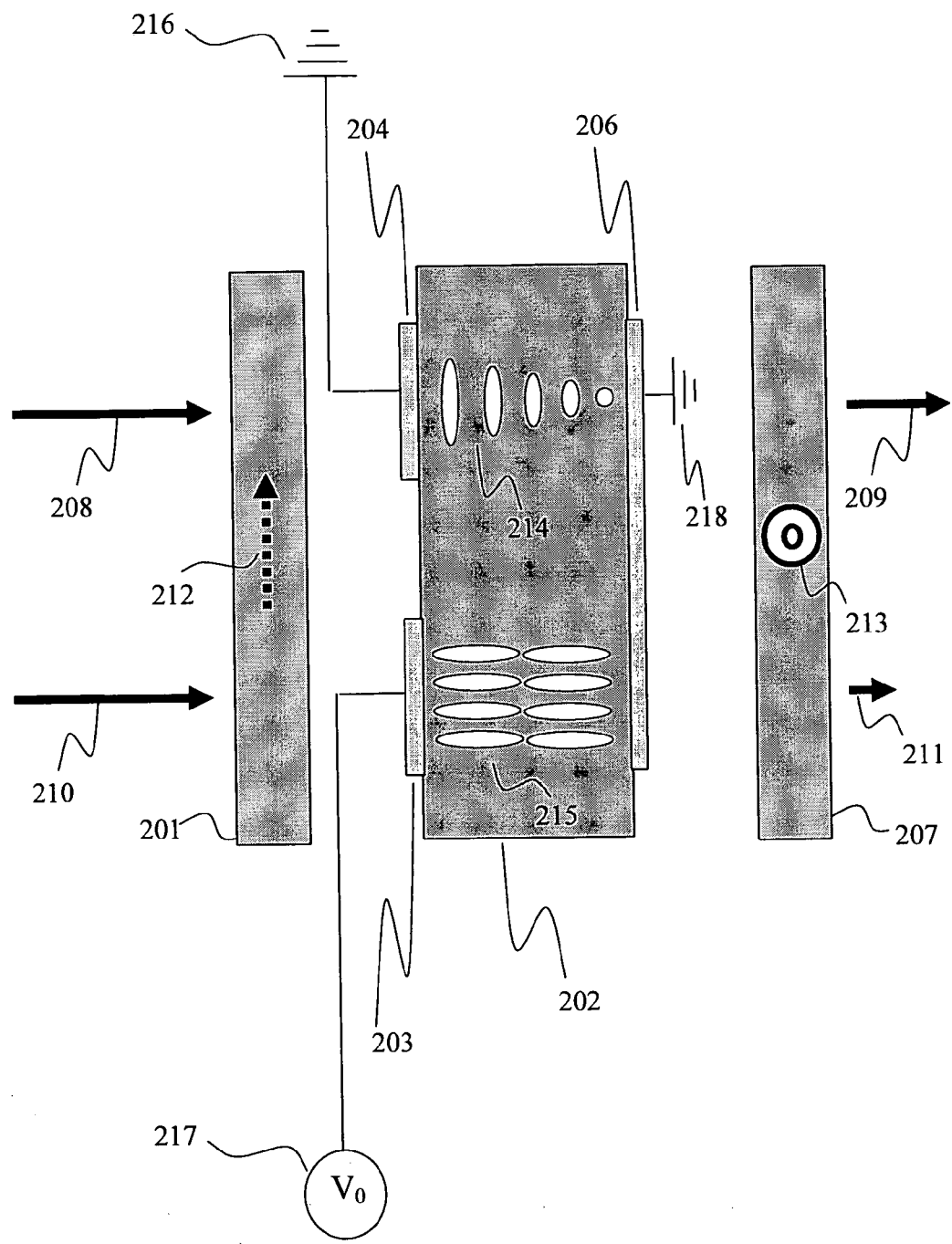
FIGS. 2a-2b schematically illustrate the operation of a standard LCD.

Referring to the prior art of FIG. 2*a* a common implementation of LC control is illustrated. The front polarizer 201 is polarized in the upwards vertical direction as indicated by the arrow 212. The back polarizer 207 is polarized in the direction coming out of the page, as indicated by arrowhead 213. Liquid crystals are embedded within the liquid crystal chamber 202, which is provided with front electrodes 203, 204 for each pixel, and a back plane electrode 6, common to all pixels. In the normal 'off' state of a twisted nematic LC, no voltage is applied between the electrodes 204,206, and therefore no electric field is present in the LC chamber 202. If no field was desired, the electrodes could both for instance be grounded as indicated by ground symbols 216, 208. In this case the LC molecules take the form of a 'spiral staircase', whose form is seen in cross section by the ellipses 214. The ellipses represent the elongated LC molecules, which are oriented in the vertical direction on the side closest to the front vertical polarizer 212 and are oriented in the direction coming out of the page on the side closest to the back 'out of page' polarizer 213. This alignment of the LC molecules is ensured by a series of grooves at the edges of the LC containing layer 202. The incoming light beam 208 is rotated by the 'staircase' orientations of the LC molecules 214. Therefore incoming light can exit the back polarizer 207 as a ray 209 that has been reduced by only 50% (due to the front polarizer 201).

When a 'high enough' voltage $V_0$ is applied to one of the front electrodes 203 by means of voltage $V_0$ 217 an electric field results in the horizontal direction, pointing from the front to back electrode. This is the 'regular' direction of the electric field used in LCDs and other LC-based devices. As indicated by the ellipses 215, the LC molecules (which are somewhat elongated structures) are rotated to align in the direction of the field due to torque arising from an internal dipole moment of the LC molecule being twisted by the external electric field. Because of this alignment, the incoming ray 210 is no longer rotated into the 'out-of-page' orientation that would enable it to pass through the back polarizer 207. Instead, the ray is largely absorbed, and the transmitted beam 211 is relatively weak. Thus far, the operation of this apparatus is of the standard type used in most LCDs.

Figure 2B:
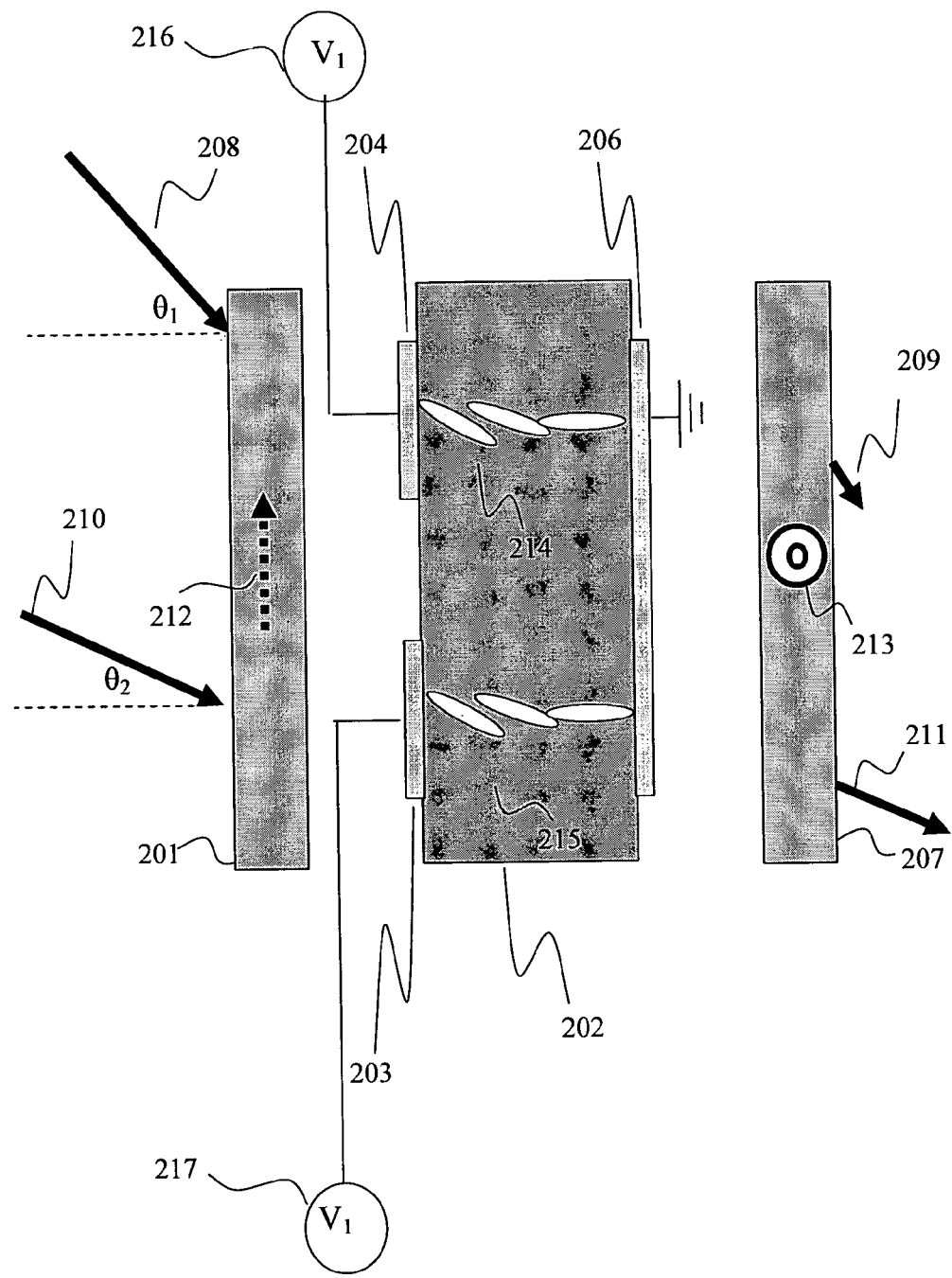

Next we illustrate the result of using a weakened electric field. A weaker electric field $E_1$ results from a decreased voltage $V_1$ that is less than the 'nominal' voltage $V_0$. The situation is depicted in FIG. 2b. In this case the LC molecules do not completely rotate into the direction of the field, but rather remain in intermediate orientations as shown by the LC molecules 214,215. The voltages in both top and bottom front electrodes 203,204 are kept at $V_1$ 216, 217. Now the dependence of transmission amplitude on incidence angle can be shown. For a steep angle of incidence $\theta_1$ in the case of the top ray 208, the transmission is greatly suppressed, as is shown by outgoing ray 209. For an incoming ray 210 closer to normal, at angle $\theta_2$, the transmission is greater as indicated by ray 211.

Although in general the front and back polarizers are at right angles, they can in principle be used in a parallel configuration. In that case for zero applied voltage the device will block light, while for a high enough applied voltage the device will largely pass light. For purposes of the present invention, in some embodiments the polarization directions of both polarizers may be parallel, perpendicular, or may have other relative angles.

Figure 3:
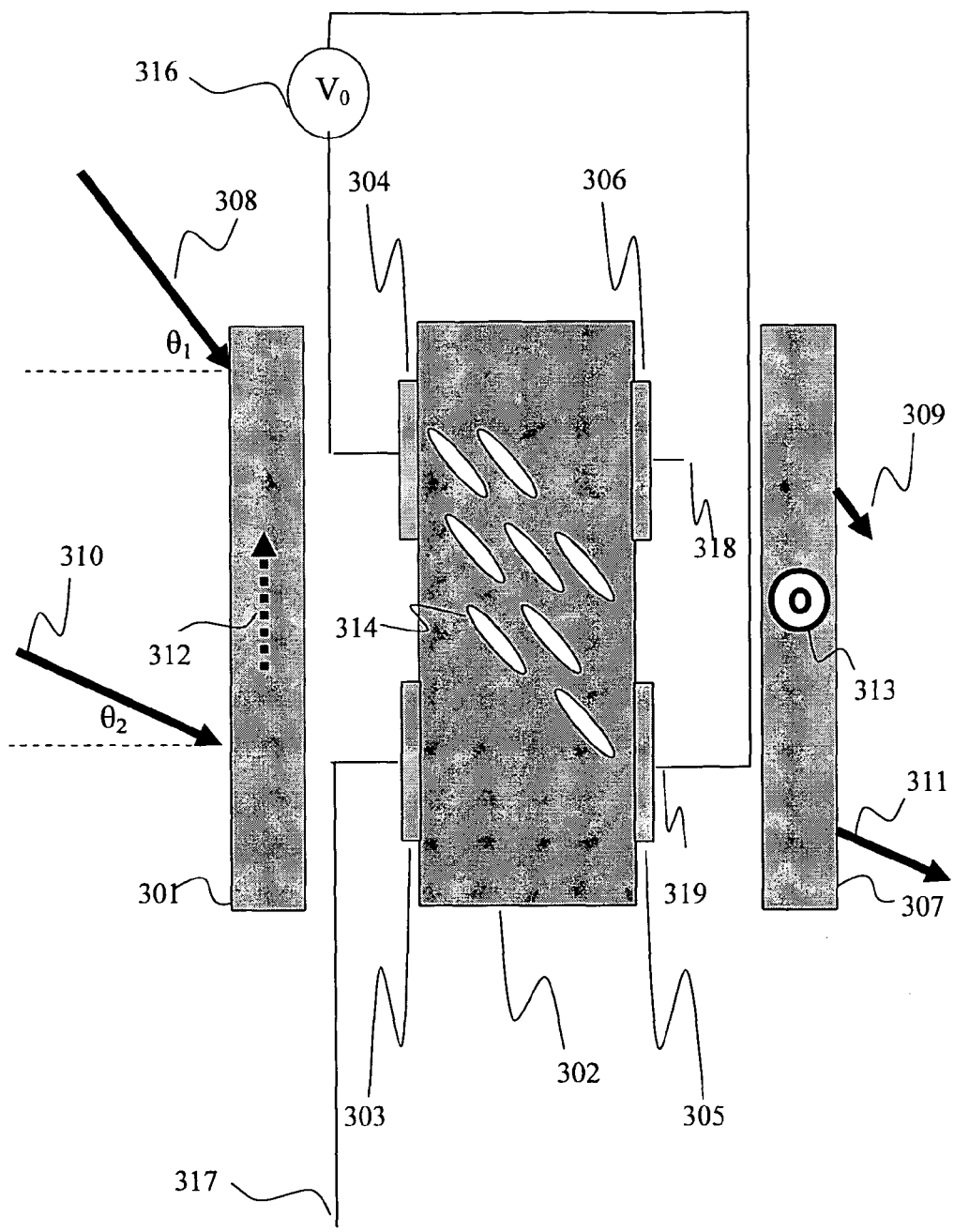
FIG. 3 schematically illustrates one embodiment of the present invention, with multiple front and back electrodes.

Two of the key modifications of the current invention lie in the use of non-facing electrodes and voltage sequences to create fields at arbitrary angles, not just perpendicular to the device faces. As shown in FIG. 3, in the main embodiment of the device, the single counter electrode of normal LC devices is replaced by a plurality of back electrodes 305,306. A voltage $V_0$ 316 may now (for example) be applied between top front electrode 304 and bottom back electrode 305, while bottom front electrode 303 and top back electrodes 306 may be left floating 317,318. If the field strength is large enough the LC molecules 314 will again tend to align in the direction of the applied field which now points from top front electrode 304 to bottom back electrode 305. An incoming ray 308 at an angle $\theta_1$ depending on that of the LC molecules 314 will be maximally attenuated, with small transmission magnitude 309. An incoming ray at a different angle of incidence $\theta_2$ however will be less attenuated, as seen by transmission magnitude 311.

It will now be clear to one skilled in the art that a range of angles may be given to the LC molecules. Referring to FIG. 3, it will be shown that the LC molecules 314 may be tilted into any angle even though the electrodes 303-306 of the example are at fixed positions and hence the angle defined by the lines connecting their midpoints are fixed. One way this may be achieved is by applying a voltage that varies in time. For example, if half the time voltage is applied from bottom front electrode 303 to bottom back electrode 305 (as in FIG. 2a), while the other half of the time a voltage is applied between top front electrode 304 and bottom back electrode 305 (as in FIG. 3), the direction of the LC molecules will reach an intermediate angle between the horizontal orientation 215 of FIG. 2a and the large angle of the LC molecules 314 of FIG. 3. The frequency with which the voltage is alternated may be advantageously chosen to be greater than the relaxation frequency of the LC molecules, such that said molecules do not have time to rotate into the direction of the applied field but are rather trapped in a specific intermediate direction.

Figure 4A:
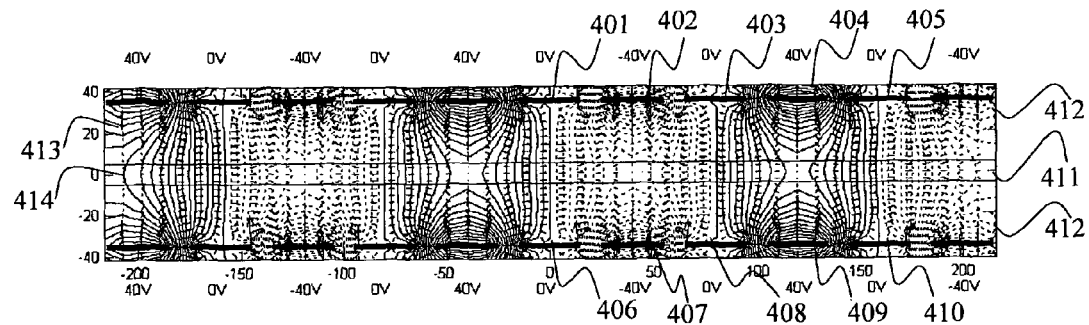
FIGS. 4a-c schematically illustrate a sequence of applied voltages and the spatial pattern required to produce a LC orientation parallel to the faces of the LC layer.
Figure 4B:
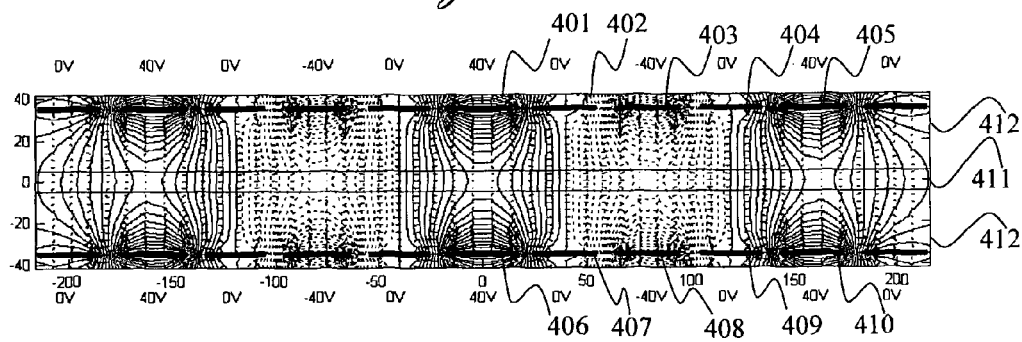
Figure 4C:
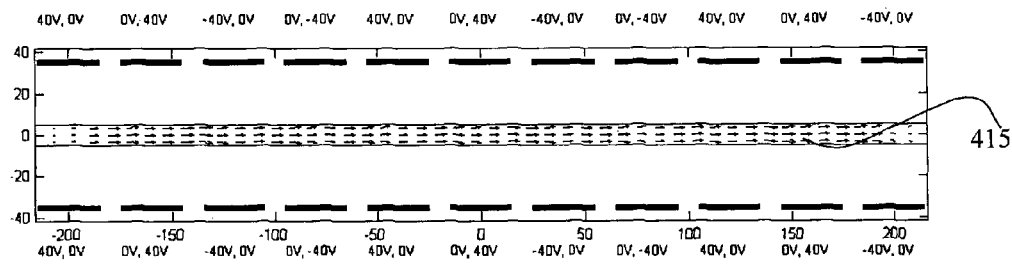

To ensure that the entire LC layer 302 attains the same orientation, two-voltage or multi-voltage temporal sequences may be applied to each of the electrodes that results in a specific spatial pattern. Referring to FIG. 4a-c, we see the sequence of applied voltages and the spatial pattern required to produce a LC orientation parallel to the faces of the LC layer. A series of individual electrodes is used on both top (401-405) and bottom (406-410) of the LC layer. A voltage pattern is applied that repeats after several electrodes. In the example given, there are transparent electrodes centered every 40 μm, specifically an electrode at $\theta_1$ μm (labeled 401), an electrode centered at 40 μm (labeled 402), an electrode centered at 80 μm (labeled 403), an electrode centered at 120 μm (labeled 404), an electrode centered at 160 μm (labeled 405), etc. The LC layer 411 (the volume occupied by LC molecules) is in some of the embodiments spaced away from the electrodes by a polyimide layer (labeled 412) or by other material. All the specific locations, distances, voltages, electric fields, time interval and/or frequencies are given as examples and do not restrict the generality of the disclosed methods.

Referring to FIG. 4a we see the first voltage pattern applied to the electrodes, called 'phase A'. In phase A the voltage given to the electrode 401 is 0V, the voltage given to electrode 402 is −40V, the voltage given to electrode 403 is 0V, the voltage given to electrode 404 is +40V, and the pattern repeats with the voltage given to electrode 405 of 0V. The same voltages are applied to the bottom electrodes 406-410.

Referring to FIG. 4b we see the second voltage pattern applied to the electrodes, called 'phase B' which is shifted relative to phase A. In phase B the voltage given to electrode 401 is 40V, the voltage given to electrode 402 is 0V, the voltage given to electrode 403 is −40V, the voltage given to electrode 404 is 0V, and the pattern repeats with the voltage given to electrode 405 of 40V. The same voltages are applied to the bottom electrodes 406-410.

FIGS. 4a, 4b show the electric field vectors 413 (small arrows) and equipotential contours 414 (curved lines) resulting from these voltage patterns. Positive equipotential contours are drawn as solid contours, and negative equipotential contours are drawn as dashed contours. It is evident from these electric field patterns that each LC molecule will experience either a field pointing horizontally (parallel to the plane of the panel), or no field. Furthermore any particular molecule will experience only one direction of field; for instance those centered at 0 μm (between electrodes 401, 406) will experience a right-pointing field in phase A (FIG. 4a) and no field in phase B (FIG. 4b), returning to a right-pointing field in the next phase A. Those molecules centered at 40 μm (between electrodes 402, 407) will experience no field in phase A (FIG. 4a) and a right-pointing field (parallel to the plane of the panel) in phase B (FIG. 4b), returning to no field in the next phase A. Similarly those molecules centered at 80 μm (between electrodes 403, 407) will experience a left-pointing field (also parallel to the plane of the panel) in phase A (FIG. 4a) and no field in phase B (FIG. 4b), returning to a left-pointing field in the next phase A. Those molecules centered at 40 μm (between electrodes 402, 407) will experience no field in phase A (FIG. 4a) and a left-pointing field in phase B (FIG. 4b), returning to no field in the next phase A.

Also, for most locations within the LC volume, the stronger the electric field in phase A, the weaker it is in phase B, resulting in relatively uniform time-averaged electric fields magnitudes and directions.

Since applied electric fields exert torques upon the LC molecules unless the molecules are oriented with their long axes parallel to the fields, and since the cycle times for the phase alternations are chosen to be short relative to the LC response time, the LC molecules will reach stable equilibrium orientations that are, for each location, the weighted time-averages of the local applied electric fields.

It should be noted that due to the symmetry of the LC molecule, reversing the electric field will have no effect on the equilibrium orientation of the molecule. Therefore the two phases A,B referred to above can be followed by further phases C,D of opposite polarity from phases A,B. The average value of the electric field at any point is now zero. A zero net field is known to be advantageous for LC applications since there may be ionic components to the LC suspension or the LC molecules themselves which would tend to drift from their original locations in a nonzero DC field.

In FIG. 4c the stable equilibrium orientations of the LC molecules are illustrated by arrows 415. The arrows' directions are parallel to the stable equilibrium orientations of the long axes, and the arrows' lengths are proportional to the stability of these orientations (the magnitudes of the returning forces). As one can see in the figure, the stable orientations always lie parallel to the panel's plane (in the horizontal plane).

Figure 4D:
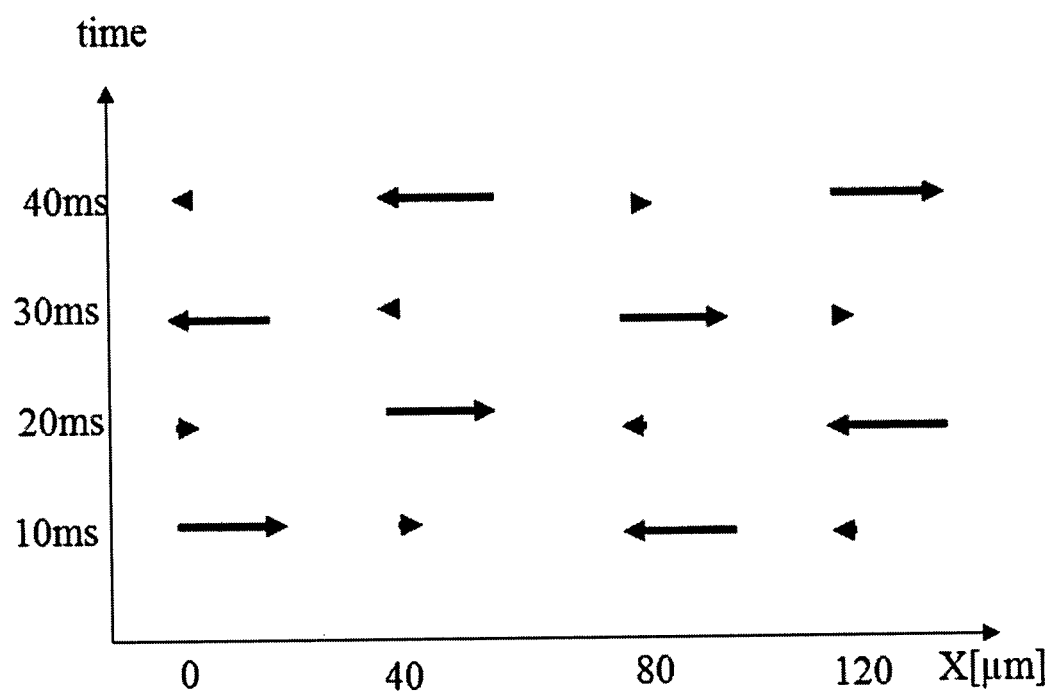
FIG. 4d. schematically illustrates the applied electric field of FIGS. 4a-c.

This sequence of electric field directions is illustrated schematically in FIG. 4d. In this figure the vertical axis (y-axis) represents the time axis and the x-axis represents the x-direction (horizontal direction) of FIGS. 4a-c. At 10 ms phase A is applied to the electrodes, causing the LC centered at 0 μm to experience a right-pointing field, those at 40 μm to experience a zero field, those at 80 μm to experience a left-pointing field, etc. At time t=20 ms phase B is applied, with the results pictured. There will be a net average field experienced, and a net average torque tending to align the LC molecules in the direction shown in FIG. 4c. The opposite voltages are applied in phase C (30 ms) and D (40 ms) with the resulting opposite fields, achieving a zero average field. All references to specific time instances are given as examples and do not restrict the generality of the method.

Figure 5A:
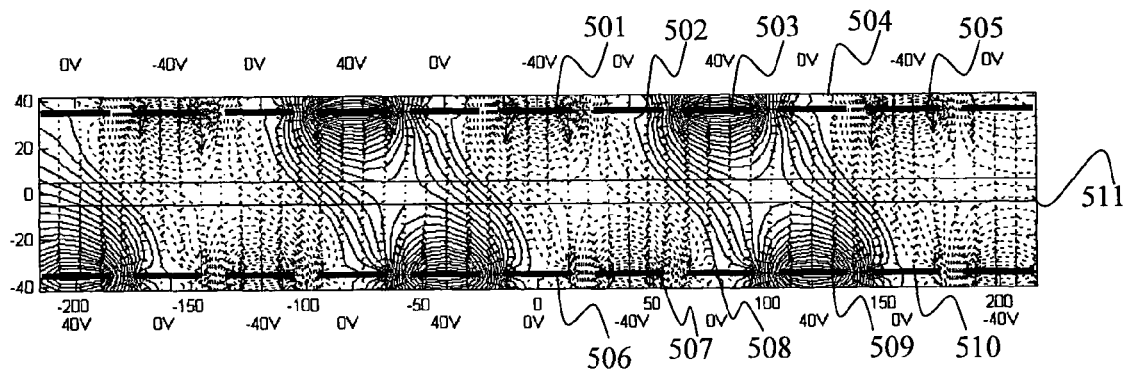
FIGS. 5a-5c illustrate an example for further manipulations of electric field.
Figure 5B:
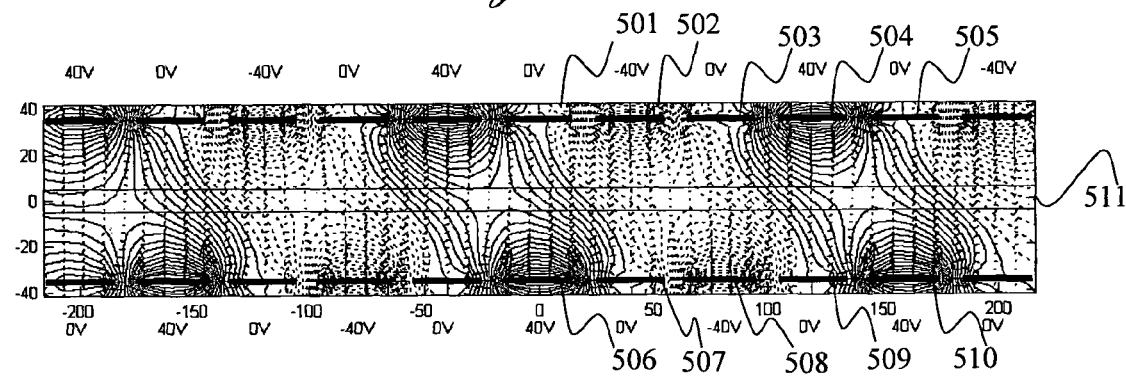
Figure 5C:
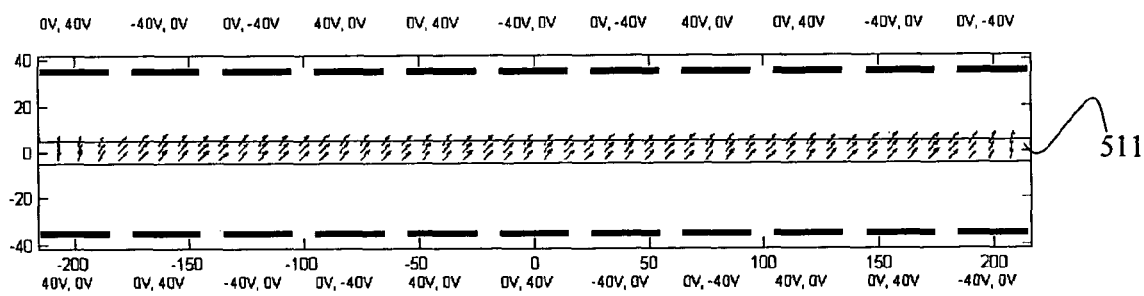

Further manipulations are now possible due to the independent control over front and back electrodes. An example is given in FIGS. 5a-5c. Here in phase A (FIG. 5a) one applies voltages −40V, 0V, 40V, 0V, −40V etc to top electrodes 501-505. Bottom electrode voltages however are now shifted with respect to the top electrodes, with voltages 0V, −40V, 0V, 40V, 0V etc applied to bottom electrodes 506-510. Phase B is described in FIG. 5b. As seen in FIGS. 5a,5b the absolute values of the applied electric fields in the LC volume now have a diagonal direction and their average values over the two temporal phases have a relatively uniform magnitude and direction. The weighted time averages of the applied electric fields result in equilibrium orientations of the LC molecules where zero average torques are exerted on them by the applied fields. These equilibrium orientations are plotted in FIG. 5c where one sees that the resulting orientations have a 45 degree diagonal direction.

Intermediate directions can be obtained by use of more than two phases and/or by varying the amounts of time spent in a given phase relative to the other phases and/or by superposition of several sets of voltage sequences each of which results one predetermined equilibrium direction, and/or by pre-defining sets of voltage sequences each of which results a different LC equilibrium direction, and/or by using any method of interpolation or spanning a vector space using a given basis.

Obviously the 'standard' LC direction (normal to the face of the LC layer) can be obtained by applying the same voltage V1 to all of the top electrodes while, applying a different voltage V2 to all of the bottom electrodes.

Figure 6:
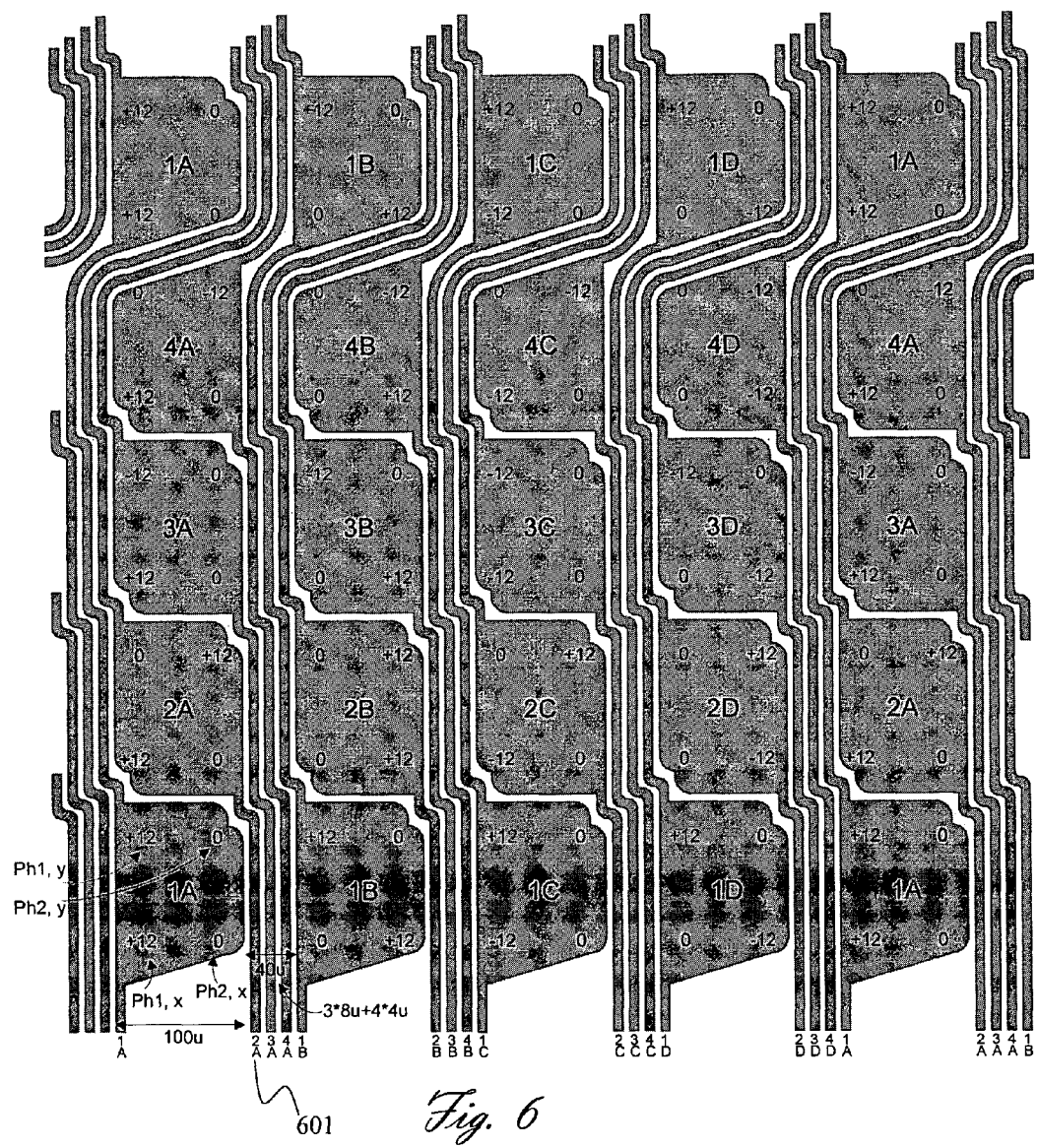
FIG. 6 illustrates a two dimensional control of the LC directions by using a two-dimensional array of electrodes.

Two dimensional control of the LC directions can be attained (amongst other methods) by using a two-dimensional array of electrodes. Such an array is illustrated in FIG. 6, which is a top view of a layer of transparent electrodes for use in a LC control system. In analogy to FIGS. 4 and 5 wherein a linear array of electrodes is used, a planar array of electrodes is used in FIG. 6. The dark (or grey) features outline the conductive features, and the white areas outline the rest of the panel (non-conductive areas). The relatively large rectangles (or pads of any form) make up the pixels, and the narrow paths make up the electric connections between the pixels. This figure shows only a fraction of the layout. The panel (usually) contains many more pixels, so the actual layout extends beyond this fraction of an area (but continues with the same pattern). The conductive pads and features at the edge (or edges) of the panel for making the external connections are not shown since this is known in the art. By varying the spatial pattern of voltages applied in a timed sequence, at a given temporal phase all pads arranged in a the same row can be held to the same voltage while at another temporal phase all pads arranged in a given column can be held to a given voltage. Therefore, the direction of the LC molecules can now be varied in two dimensions, with full control over the azimuthal and horizon angles of the LC molecules (the long axes of the LC molecules can be oriented toward any desired spatial direction). The traces 601 can be continued through the length of the pattern as it repeats multiple times to cover a large area. By means of the 16 independent traces, full two-dimensional control can be attained, as one-dimensional control was attained in FIGS. 4 and 5 with four independent electrodes. A similar pattern to that shown in FIG. 6 would be printed upon both top and bottom glass or polymer surfaces in order to implement the transparent electrodes. As an example, voltages that may be applied to the pads (electrodes) are written on the corners of each pad. The voltages at temporal phase 1 that define effective row-striped electrodes and thus tilts the LC molecules in the y direction are indicated at the upper-left corner of each pad (Ph1,y). A second phase is required for this tilt and the voltages are indicated at the upper-right corner of each pad (Ph2,y). The two phases that define effective column-striped electrodes and thus tilts the LC molecules in the x direction are indicated at the lower-left and lower-right corners of each pad (Ph1,x and Ph2,x). This example should not decrease the generality of our methods as other voltages, other number of phases, other sequences or other values of any parameter may be used.

It is within provision of the invention that the transparent electrode layer (such as the layout that is illustrated in FIG. 6 or other layouts that are herein described) may be separated from the liquid crystal layer by a transparent layer, such as a Polyimide layer or any other polymer layer, or any other transparent layer.

In the example of FIG. 6 the sets of interconnected pixels (pads) located are within a row, or within a column. In this illustration of an example of the layouts of the conductive features, each fourth pixel within a column is interconnected to each other. Therefore, only four edge external connecting pads are required for each column, even if the panel contains hundreds or thousands of pixels in a column. All the pixel's pads that are marked by the same designation (and are located on the same column) are interconnected: all 1A pixels (on the same column) are interconnected, all 2A pixels (on the same column) are interconnected, and so on.

Obviously a different number of traces could be used to provide finer or coarser control of the electric field direction, or alternatively to control smaller or larger sets of pixels at once, or alternatively to control entire areas of the LCD separately. Also, the interconnecting traces that cross from one side of a column of pixels to the other side of the same column of pixels (see FIG. 6 between row #4 that contains pads 4A,4B,4C etc, and the row above it that contains pads 1A,1B, 1C etc), may be implemented for each column between different rows, instead of all implemented between the same rows of pixels as appear in FIG. 6.

In some embodiments of the invention, all of the pixel's pads that are marked by the same designation (no matter on which column they are located) are interconnected. In other embodiments of the invention, each column has independent four external (edge) connection pads. In some other implementations of this type, each group of more than one adjacent columns has all the pixel's pads that are marked by the same designation (and that are located within one of the columns in that group) are interconnected (and therefore join the same external edge connection pad). In some other implementations of this type, all the pixels that have the same designations from the entire panel are interconnected, but only for a subset of the designation types that are present on the panel. The interconnected pixels join the same external edge connection pad.

It is emphasized that interconnecting each fourth pixel in a column is only an example. Using the same method, every second pixel in a column or in a row can be interconnected, or every third pixel in a column or in a row can be interconnected, or every fourth pixel in a column, or in a row can be interconnected, or every fifth pixel in a column or in a row can be interconnected, or every sixth pixel in a column or in a row can be interconnected, or every N pixels in a column or in a row can be interconnected, or every other combination of non adjacent pixels in a column, or every other combination of non adjacent pixels in a row, can be interconnected, or every other combination of non adjacent pixels can be interconnected.

It will be clear to one skilled in the art that many different layouts that are topologically (or conceptually) similar to this layout are possible and these are thus claimed within provision of the invention. Generally speaking, the concept of the present invention consists of an array (or tilted array, or alternating array) of pixels (pads) wherein subsets of such pixels, that are not adjacent to each other, are connected within the panel so that a single (or few) external connecting pad can supply this set of pixels with a required voltage.

It is emphasized that the interconnections between the columns that are described here are only examples. Every other mean of interconnection between the columns that is based on layouts that are known in the art is also possible, whether it is based on a single layer of conductive material, on two layers of conductive material, or on any number of layers of conductive material.

Interconnecting similarly-designated columns, using two layers of conductive material (isolated from each other), is also possible.

The rear glass panel may be constructed similar to the first panel, using similar addressing mode of the pixels, or similar features of conductive material.

To attain full control over the LC directions, the addressing of the pixels at the bottom panel must be independent from the addressing of the pixels to the top panel, this being required for the generation of tilted electric fields with controllable direction.

For many of the implementations of panels that are passively addressed (such as the panel described in FIG. 6, but also for other panels), the features at the opposite panel are placed in 90 degrees rotation relative to the features of the first panel. This will decrease the effect of the 'dead space' between electrodes, which will have fields that are generated between the interconnecting paths within the panels.

For minimizing the volume of the liquid crystal that experiences electric fields that emanate from the narrow conducting traces or paths, the traces on each panel should not lay parallel to the traces on the opposite panel. The features of both panels may, in some of the implementations, be rotated by 90 degrees relative to each other. Thereby much of the influence on the liquid crystal by the narrow conducting traces is eliminated.

It is within the core of the present invention that any pixel addressing mechanism known in the art, including passive, active, TFT, or any other pixel addressing method be used independently for front and back electrodes of an LC-containing layer. By this independent control of electric potentials for each individual pixel (or local individual pixel) on both sides of the LC layer, the directions and magnitudes of the applied fields for the individual pixels can be controlled, thus the direction of the LC molecules at each individual pixel and/or the whole panel can be controlled, which has the result that the directions and amplitudes of maximum attenuation or attenuations can be controlled individually for each pixel and/or for the entire panel. Another variation of implementing a pixel related 2D directional field control electrodes:

TFT transistors may be utilized with a sequence of at least 2 temporal phases in a cycle. For the two-phase cycle, in one phase all the pixels that share the same row will be interconnected by the TFT transistors. In the other phase all the pixels that share the same column will be interconnected by the TFT transistors. Thus the electrodes will function like striped-shaped electrodes, but will shift between striped-electrodes in rows and striped-electrodes in columns. In each set of temporal phases electric fields can be generated that can tilt the LC molecules in another plane (there are 2 orthogonal planes that are normal to the LC panel). Therefore the equilibrium orientations of the LC molecules can be controlled as required in all directions.

In another embodiment of the invention, pixels are grouped into sets, and each set of pixels is controlled independently of the other sets. For instance, relatively distant pixels may be connected. This system results in a reduction of the number of required edge connections to the LC layer from external control circuitry.

In a preferred embodiment of the invention, both the magnitude of applied voltage and direction thereof are controlled, thereby combining the effects depicted in FIG. 2b and FIG. 3. The magnitude of applied voltage changes the direction of maximum absorption. This effect is taken into account and combined with directional control of FIG. 3, FIG. 4 and FIG. 5 to control both the direction and magnitude of maximal absorption, blocking angle width and/or absorption level at that angle. The control circuit providing the voltages 316-319 can thus control not only the darkness of a given pixel but also the direction from which that pixel appears darkest and range of directions affected.

In another embodiment of the invention, two different methods are used for each axis of a 2-axis control system for the LCD crystals (in e.g. the azimuthal and horizon directions). One axis of control is provided by changing the applied voltage as shown in FIG. 2b, while the other angle is controlled by the directional field shown in FIG. 3.

For additional efficiency, electric fields can be simultaneously established at micro-locations of the liquid crystal that are far enough from each other so as not to distort each other's local electric fields. Since the fields generated by each pad affects only LC molecules that are near this and neighboring pads, the voltage that is applied to a given pad can be applied to other, distant pads without generating electric-field interference. This allows pad addressing embodiments such as described in FIG. 6, which uses a very small number of addressing lines.

The applied electric field that is generated by the electrodes is one of the factors that determine the spatial orientation of the LC molecules. The other factors are the directions of the micro-scratches that are implemented on the (Polyimide) transparent boundaries of the LC layer, inter-molecular forces, stray external electric fields, and other secondary effects. The electric field that is generated by the electrodes at each phase polarizes the Liquid Crystal molecules and effects a rotational moment on the molecules that is a function of the local field orientation, local field strength and the orientation of each Liquid Crystal molecule. In each phase (of the period), the voltages that are applied in that phase generate their own electric fields and rotational moments on the Liquid Crystal (LC) molecules. Since the response time of the LC molecules in terms of changing their orientation can be relatively long (and even longer than the time-period of the applied voltages on the electrodes), each LC molecule can integrate or average all the rotational moments that are executed on it during a period (or a cycle).

A given set of electric fields (one for each phase) that rapidly alternate during each (temporal) period, results in a stable equilibrium orientation for each LC molecule. This means that if the applied voltages on the electrodes were the only factors that generate forces on the LC molecules, and if the temporal period (or cycle) of the alternating phases of these applied voltages were short enough, then each LC molecule averages the rotational moments that affect it in the various phases, and for each LC molecule there is a mechanical equilibrium of its spatial orientation (relative to the electrodes).

The actual equilibrium spatial orientations of the LC molecules may differ from the equilibrium spatial orientations that are calculated only from the applied voltages on the electrodes, because of the other forces on the LC molecules, but nevertheless the actual equilibrium spatial orientations of the LC molecules are a function of the equilibrium spatial orientations that result only from the effect of the applied voltages on the electrodes.

If we designate the direction that is normal to the LC layer as the "normal direction" or the "y direction", and the direction that is parallel to the LC layer as the "lateral direction" or the "x direction", then in order to generate a homogeneous LC molecules orientation in the normal direction there is no need of two (or multiple) phases, or all the phases can be identical.

To generate a homogeneous LC molecules orientation in the lateral direction that is maintained in the lateral direction for long distances relative to the electrode widths using relatively low voltages, two or multiple phases of electrode voltage sets are implemented. Each phase creates zones in the LC volume of strong fields and of weak fields, but the phases complement each other so that the resulting equilibrium spatial orientations of the LC molecules due to the effect of the applied voltages on the electrodes is (relatively) homogeneous throughout the LC volume.

In order to implement any required spatial orientation of the LC molecules (within reasonable limits) at least two methods can be implemented:
a) For any required spatial orientation of the LC molecules, a unique set of voltages is applied to each electrode in each phase of the period (even the number of phases within a period can depend on the said required spatial orientation).
b) A discrete set of predefined spatial orientations may be chosen (for example 0°, 45°, 90°, 135° relative to the lateral direction), for which the voltages on all the electrodes in all the phases of the period that are required to produce each orientation in the LC molecules are known (each set of voltages can be applied also after multiplying all the voltages by a factor).

For any required (arbitrary) spatial orientation of the LC molecules, the two adjoining predefined spatial orientations will be activated alternatively (or simultaneously), with the proper relative weights (by activating each adjoining predefined set for the proper percentage of the time, or by activating each adjoining predefined set with the proper factor to multiply its predefined voltages). For example, if an LC molecules orientation angle of 80° is required, and if the predefined orientations are {0°, 45°, 90°, 135°}, then the two adjoining orientations are 45° and 90°, and either the voltage sets of the 90° are activated for the majority of the time relative to the activation time of the sets of the 45°, or the voltage multiplier of the 90° is larger than the voltage multiplier of the 45°.

In most of the implementations, a 180° rotational symmetry exists in the LC molecules. Therefore equilibrium spatial orientations that differ by 180° are equivalent (for example 0° and 180° are equivalent; 45° and −135° are equivalent; −45° and 135° are equivalent; 90° and −90° are equivalent; etcetera . . . ).

Resistive Current-Carrying Electrodes

Figure 7:
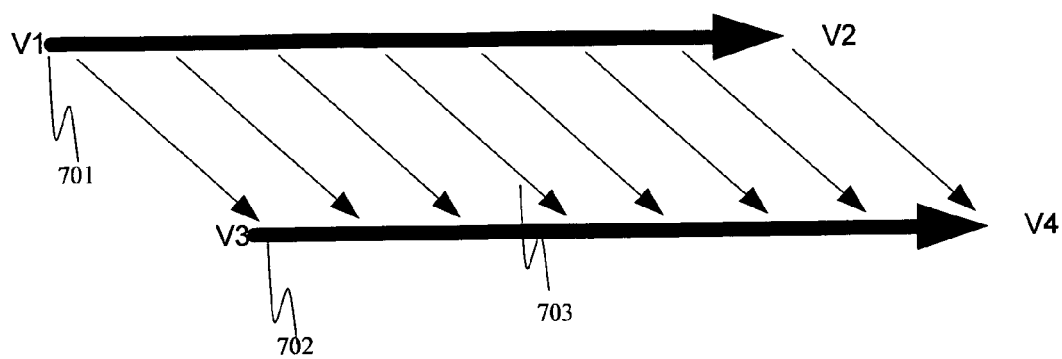
FIG. 7 illustrates fields with components in the direction parallel to the face of the LC layer are obtained by using resistive, current-carrying electrodes.

In another embodiment of the invention, fields with components in the direction parallel to the face of the LC layer are obtained by using resistive, current-carrying electrodes. Since the voltage in such an electrode will drop along its length, the electric fields generated between two such electrodes carefully arranged will have a component in said parallel direction. An example of this embodiment is shown in FIG. 7. By applying different voltages to the to two ends of a top-side electrode V1,V2, and by applying different voltages to the to two ends of a bottom-side electrode V3,V4, the electric potentials at each location of each electrode can be controlled, as for each electrode the potential is a linear function or other function determined by the electrode's shape and resistance. The electric field between these electrodes will then take the form indicated by the arrows 703 or other forms that may be tilted relative to the normal to the panel. By varying the voltages involved one may achieve a variety of LC equilibrium angles and hence control the direction of greatest incident light absorption.

By implementing a pair of electrode layers having parallel stripe-shaped configurations on both sides of the LC layer, and by supplying different voltages to the striped-electrodes, in one or two, or several phases in a period, a controlled tilted electric field is produced within the volume of the LC layer. This field will occur in a plane that is normal to the stripes' direction. By connecting each (or a part of) of the striped-electrode to electrical power sources at each of the ends of the stripe, the current that runs through each striped-electrode can be controlled. Because of the finite electrical resistivity of each striped-electrode (that can also be made relatively high), the current through the stripe creates a gradient of electric potential throughout the stripe, and this produces a gradient of electric potentials also in the (nearby located) volume of the LC layer. Therefore, these currents produce an electric field in the volume of the LC beneath the striped-electrode that is directed parallel to the direction of the stripes, in a two-dimensional analog of the situation shown in FIG. 7.

Another embodiment is as follows. Two electrode layers that contain stripe-shaped electrodes at both sides of the LC are used. All the electrodes (in both layers) are parallel to each other. By applying voltages to the electrodes, electric fields can be generated that can have a controllable direction within a plane that is normal to the direction of the stripes. By mechanically rotating the entire LC panel, including all its layers such as the electrode layers, the plane in which the direction of the electric field can span, can be turned, allowing the system to control the direction of the electric field with two degrees of freedom.

By controlling both the voltages that are supplied to each of the striped-electrodes and the electrical currents that are running through each of the striped-electrodes, electrical fields can be produced in the volume of the LC layer that produce controlled equilibrium directions.

According to a preferred embodiment of the invention, arrays of transparent electrodes are printed or otherwise deposited on glass panels by methods known in the art. In one embodiment of the invention these electrodes are composed of indium-tin-oxide (ITO). A transparent polyimide layer may be placed or printed between the glass/ITO layer and the LC layer. This polyimide layer is then grooved in a given direction to cause the LC molecules to align in the direction of the grooves. These grooves are often created by rubbing the polyimide layer in the desired groove direction. In some of the embodiments of the invention the grooves at the opposite sides may have a relative angle of 90 degrees; in other embodiments the grooves at the opposite sides may have a relative angle of zero degrees or any other number of degrees. In some of the embodiments of the invention there may be no grooves at a given side or at any side.

Practical aspects of the implementation of the invention are now discussed. For a finer control over the electric field direction in the LC layer, two methods may be used:
1. Use of smaller electrodes (where 'small' is as compared to e.g. the distance between top and bottom electrodes).
2. Use of a large distance from electrodes to LC layer (where 'large' is as compared to e.g. the distance between top and bottom electrodes).
3. Use of electrodes on the side of the glass layer opposite the LC layer.

This large distance may be achieved by use of further glass separation layers or thicker polyimide layers, as will be obvious to one skilled in the art. By way of non-limiting example, consider an LC layer having a thickness of 10 μm (10 micrometer), and transparent electrodes with a width of 30 μm. A reasonable spacing of 30 μm between the electrodes layer and the nearest Polyimide—LC boundary layer (or the nearest LC boundary) is required for achieving reasonable directional control of the electric fields in the LC volume (for the given widths of the electrodes). Such 30 μm spacing may be achieved using a 30 μm thick layer of Polyimide (on each side of the Liquid-Crystal layer). All reference to specific dimensions is only given as an example, and other dimensions may be implemented.

In one embodiment of the invention the ratio between the size of said electrodes in their largest dimension to the distance between said upper and lower electrodes is between about 10 and 0.01.

It is within the scope of the invention that any transparent spacer layer material can be used instead of or in addition to a Polyimide layer.

To block several directions at once, several directional filters as described above may be placed in series, each blocking a particular direction while passing the rest. Alternatively, a single directional filter may be used that simultaneously blocks several directions by dedicating e.g. half of its pixels to blocking a first direction, and using the other half of its pixels to block a second direction. Obviously this method has the drawback that the maximum blocking that can be provided is decreased since the $2^{nd}$ direction will be allowed by the 1st pixels and vice versa.

Light Detector

Most of the aforementioned devices are preferentially equipped with a direction-sensing light detector to allow automatic open- or closed-loop control over the direction of maximum incident light absorption. This may be accomplished by one of many means known in the art such as an array of light sensors, a four-quadrant light detector, a light detector array that has other number of adjacent sensors, a low resolution imaging device (CMOS imaging device or CCD), an imaging device (CMOS imaging device or CCD), a set of light sensors, an array of 2×2 photovoltaic cells, an array of any number of photovoltaic cells, or any other combination of devices that respond to light and that respond differently for light that is coming from different directions. For antiglare applications that protect cameras, surveillance cameras, still cameras, video cameras or similar devices, the imaging device can be the very imaging device of the camera, and/or a separate imaging device. The devices are further preferentially equipped with controlling circuitry of a suitable type that will be obvious to one skilled in the art (such as a microcontroller, an ASIC controller, FPLD, analog circuit, or any other type of controlling circuitry). The devices are preferentially further equipped with a power source (such as photovoltaic cells that may or may not function also as the light detector array, or primary cell(s), or secondary cell(s), or any other type of electric power), or provided with adaptors to facilitate connection to external power sources.

The direction-sensing light detector determines if a high-intensity light source that radiates light with high enough intensity and with a direction that penetrate the LC panel (and that may reach the protected zone such as the lens or the eyes), is present. The intensity and direction of such glaring light is determined in real-time. Such light may be the sun, or a projector, or headlights, or a welding-arc, or a LASER beam, or any other directional light source.

Control circuitry with input from the light sensor(s) and output to the directional filter determines the intensity and direction of the required electric field to apply to the liquid crystal material within the panels of the glasses, which will result in light absorption that is maximal in the direction of the high-intensity light source. The amount of said absorption is furthermore controlled such that the rays that arrive from the high-intensity light source and penetrate the directional filter are attenuated enough to prevent glare in the transmitted light (which eventually is used by e.g. a camera or a user). In many of the implementations, the operator, the system or the user has control over the magnitude of the maximal attenuation (in several of the implementations the operator, the system or the user may also have control over the direction of maximum absorption).

The preferred location and orientation of the light detector array should be such that it will face approximately in the direction of expected incoming light. For example this would be toward the same direction as the lens faces for camera protection applications, toward the front of the sunglasses (normal to the lenses) for sunglasses applications, or in general oriented such that the center of the filter's light sensing field of view will be similar to the center of the light sensing field of view of the protected camera, system or user. The light detector array can be located at any location that has field of view to the front of the camera, system or sunglasses, or can be the camera's own light detector array. There may be more than one light detector array. The determination of the direction and intensity of the high-intensity light source can be performed in several ways:
1) Imaging device with lens (or lenses, or a mirror, or mirrors, or with a pinhole). The imaging device can be implemented using CCD, CMOS imaging technology, photovoltaic array, or any other imaging technology known in the art. From the location of the focused image of the light source on the surface of the imaging device or the light detector array, the direction of the direct glaring light rays can be inferred.

2) Four-quadrant light detector (or a detector with any other number of light sensing regions), or an imaging device, or photovoltaic array, with a focusing device such as a lens (or lenses, or mirror, or mirrors) that is placed such that light that arrives from sufficiently large field of view at the front of the sunglasses will be converged but not necessarily focused at the light detector's plane.

3) Four-quadrant light detector (or any other number of light sensing regions), or an imaging device, or photovoltaic array, with a hole (or transparent opening) in front of the light detector array.

Directional Filter Utilizing Polymer Dispersed Liquid Crystal

Another embodiment of the directional filter involves panels where micro droplets of liquid crystal material(s) are dispersed within a polymer matrix also known as a Polymer Dispersed Liquid Crystal. Our novel approach involves using multiple electrodes at each face of the PDLC sheet (at each side of the plane that is defined by the PDLC), so that by supplying each electrode with voltages that change in time, electric fields are produced in the volume of the PDLC sheet, possibly in several temporal phases. The spatial orientations and magnitudes of the electric fields in each temporal phase are controlled by said applied voltages (which are used to control the orientation of the long axes of the LC molecules, by methods similar to those explained in the previous embodiments not using PDLC).

In each temporal phase the produced electric fields exert forces on the liquid crystal molecules that are in effect mechanical moments that tend to reorient the LC (liquid crystal) molecules along the local lines of electric field. By switching at a fast enough rate between several applied electric fields (with each field exerting a different set of moments on the LC molecules), each LC molecule will assume a spatial orientation in which the mean mechanical moment on itself will nullify. Each LC molecule will be in an equilibrium orientation (that can be described by two orthogonal angles).

All the concepts, methods and implementations that are discussed in this document regarding the generation of electric fields with controlled orientations (and magnitudes) within the volume of a regular liquid crystal sheet, apply also to the generation of electric fields with controlled orientations (and magnitudes) within the volume of a PDLC (Polymer Dispersed Liquid Crystal) sheet, and apply also to the generation of electric fields with controlled orientations (and magnitudes) within the volume of a PSLC (Polymer Stabilized Liquid Crystal) sheet.

The device has a set of transparent electrodes at each side of the PDLC panel that are addressed by various voltages that switch in time, all as described in this document so as to generate controllable electric fields within the volume of the PDLC panel (or sheet) that exert electrical forces on the liquid crystal molecules within the panel that let the orientation of the liquid crystal molecules be stable at a controllable direction (a direction that is defined by two independent spatial angles).

A directional filter using this embodiment, preferentially uses a refractive index of the (usually polymer) matrix $n_p$ similar to the ordinary refractive index of the LC material $n_o$, both being different from the LC's extraordinary refractive index $n_e$. When the long axes of the bulk or of all of its LC molecules are oriented toward a specific spatial direction (the "LC direction"), the difference between the refraction indices $n_p$ and $n_e$, combined with the highly curved shapes of the LC droplets, will scatter light rays whose direction of incidence is approximately normal to the LC orientation and are polarized parallel to the LC direction. The result is a panel that is relatively transparent in most directions but has relatively hazy, or blurred stripe in the directions normal to the LC direction. We shall define the spatial direction from which direct glaring rays appear, or the spatial direction at which the view needs to be blocked, as the "particular direction".

In one embodiment of the invention, a PDLC sheet as described in this document and/or as known in the art is provided with sets of transparent electrodes that function as described above. Said electrodes enable the production of electrical fields within the volume of the PDLC sheet with arbitrary controlled spatial orientations and further enable production of the required equilibrium orientations of the liquid crystal molecules within the liquid crystal droplets.

The applied voltages orient the liquid crystal molecules within the liquid crystal droplets; the orientation of the long axes of the LC molecules (the "LC direction") always maintains 90 degrees angle relative to the "particular direction". In several implementations the applied electric fields within the volume of the PDLC film are rotated in time so that the LC molecules' orientation also rotates. Each molecule rotates around an axis that passes through the molecule and is oriented parallel to said "particular direction".

Figure 8:
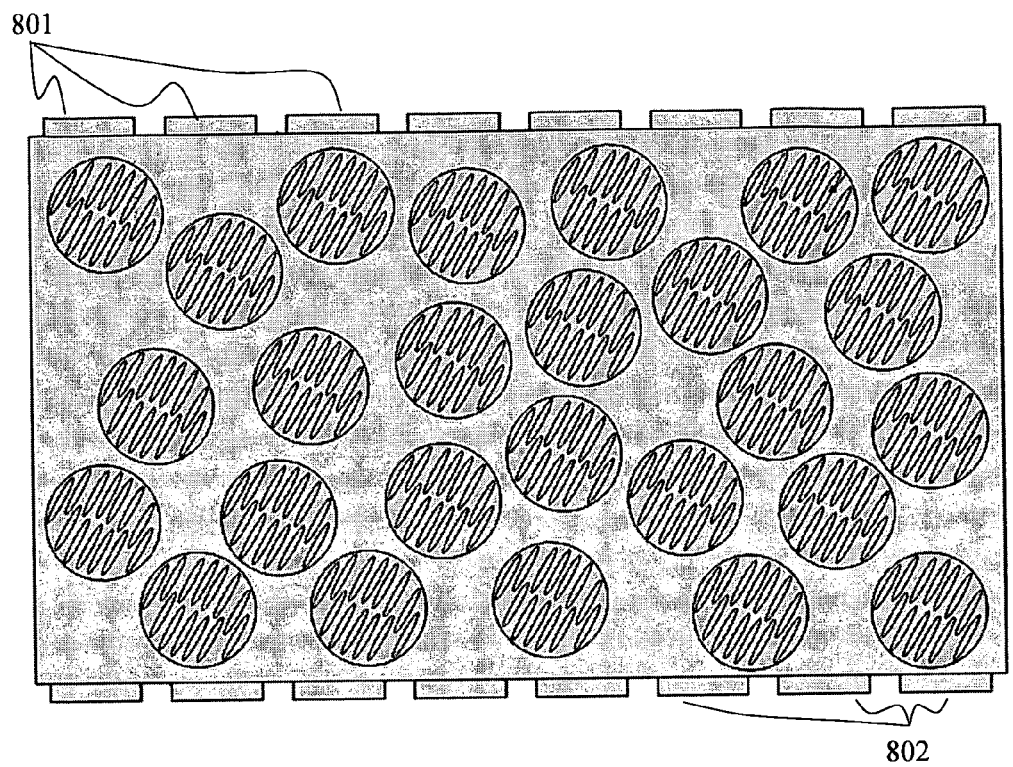
FIG. 8 illustrates another embodiment of the present invention in which directional filter using a PDLC is used.

In FIG. 8 an embodiment of the directional filter using a PDLC is illustrated. Transparent electrodes 801, 802 are used to induce electric fields in the LC layer as in the aforementioned LC embodiments.

Figure 9:
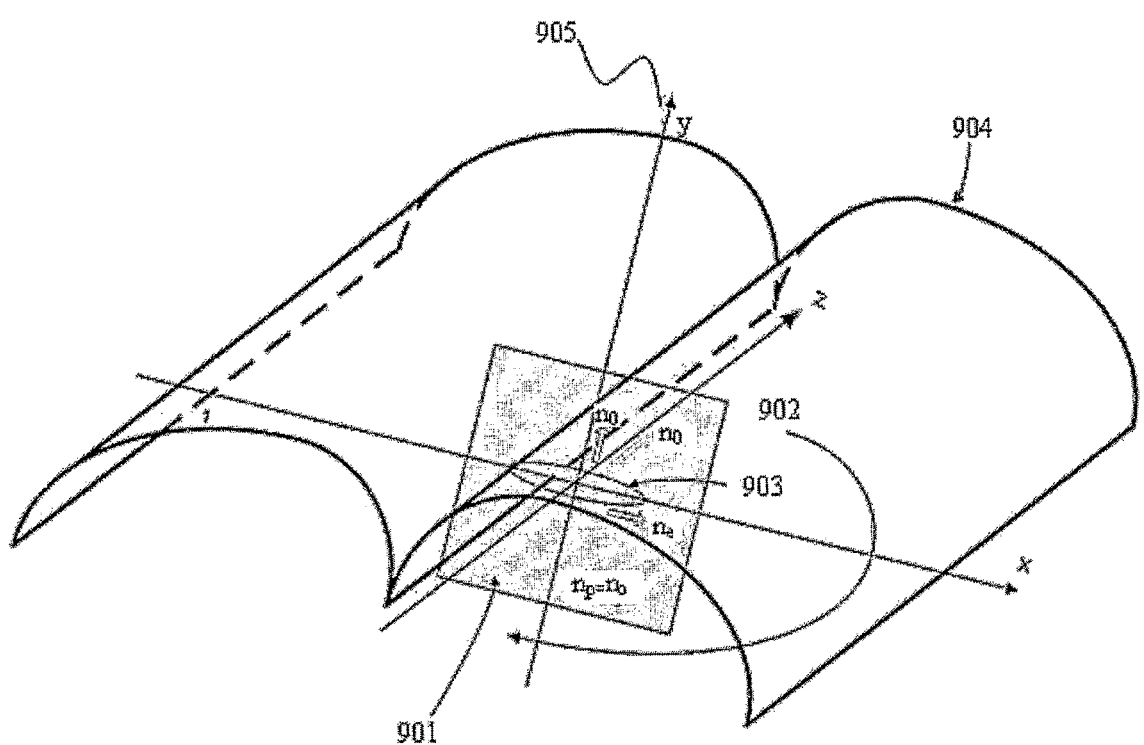
FIG. 9 illustrates the transmission of light that is polarized at the xy plane as function of incidence angle in some of the PDLC based embodiments.

See FIG. 9 for an illustration of an example of the normalized light transmission graph, showing transmission 904 as a function of the spatial direction of the incoming light. The graph illustrates the transmission for light rays which are polarized with electrical components that are in planes that contain lines that are parallel to the "LC direction". In other words, the graph illustrates the transmission for light rays which are not polarized normal to the orientation of the long axes of the LC molecules 903. The orientation of the long axes of the LC molecules 903, the "LC direction", is always maintained normal to the "particular direction" 905, while said "LC direction" is also rotated in time around an axis parallel to the "particular direction". Therefore, the panel will appear to a viewer that observes or to a camera that images a scene through the panel as hazy for a rotating stripe that rotates 902 around an axis 905 that connects the viewer with the object at the far side of the "particular direction", and as progressively more transparent for view angles that are further from the hazy stripe.

Since the said hazy stripe rotates quickly in time (in comparison to the speed of the human visual system), only the "particular direction" will always be obstructed by haziness, but the other directions will be obstructed for only part of the time of the cycle of rotation, and therefore the view to the observer will be clearer and more transparent as the viewing angle is further away from the "particular direction".

Generally one will employ two mutually orthogonal rotating (or not rotating, or switching) "hazy stripes".

By implementing two cascading layers (one on top of the other) of PDLC with independent sets of controlling electrodes, so that the incoming light will have to pass both layers in order to pass the whole panel, and by feeding controlling voltages that generate the said hazy stripe in both PDLC layers where the two hazy stripes are mutually orthogonal (and both still rotating in time), all light arriving from the "particular direction" will be scattered (and virtually no light arriving from the "particular direction" will pass the device directly). The view to the observer will be clearer and more transparent as the viewing angle is further away from the "particular direction".

In this set of implementations, the orientations of both "LC directions" (which are the orientations of the long axes of the LC molecules at the PDLC layer that is far from the viewer and the PDLC layers that is near the viewer), are orthogonal to the "particular direction". Also, the orientation of the "LC direction" at the PDLC layer that is far from the viewer is orthogonal to the "LC direction" of the PDLC layer that is near the viewer.

In some embodiments of the invention the orientation of the LC molecules is rotated in time. In some implementations the orientation of the LC molecules is not rotated in time. In some implementations of the invention the orientation of the LC molecules is switched in time.

By generating electric fields at the side of the PDLC panel further from the viewer that establish equilibrium orientations of the LC molecules at the further side from the viewer that are orthogonal (normal) to the "particular direction" 905, and at the same time generating electric fields at the side of the PDLC panel near to viewer that establish equilibrium orientations of the LC molecules at the near side relative to the viewer that are orthogonal (normal) to the "particular direction" but that are also orthogonal (normal) to the orientation of the LC molecules at the further side from the viewer, the view seen by the viewer will be of two orthogonal hazy stripes that cross each other at the "particular direction". Virtually no light that arrives from the "particular direction", of any polarity, will pass directly towards the viewer (nor pass in the opposite direction).

The generation of the required fields only at a particular side of the panel is performed using only (or using primarily) the electrodes at the same side. At the same time, the electrodes at the opposite side are used to generate orthogonal fields.

In some embodiments of the invention, the orientations of the LC molecules are also a function of the depth within the PDLC panel.

In some embodiments the invention a light absorbing pigment is dispersed within the volume of the PDLC panel, preferably within the volume of the polymer matrix. This pigment may also be dispersed within any material of the device or at any boundary between materials within the PDLC panel.

In some of the embodiments of this device a polarizer polymer (or other polarizer material) is included within the PDLC panel so that the polarizer absorbs, within the volume of the PDLC panel, light that has an electric field component that is oriented normal to the plane that is defined by the PDLC panel. Only light that travels in a direction tangent (or parallel) to the plane that is defined by the PDLC panel may have this electric field component, although light that travels in a direction tangent to the plane of the PDLC panel may also have an electric field that is oriented tangent to the plane of the PDLC panel. Therefore including such polarizer material within the volume of the PDLC panel will result the absorption one of the two components of the light that travels parallel to the PDLC plane (within the volume of the PDLC panel) but will not affect light that travels normal to the PDLC plane.

Any discussion, description, or drawing in this document regarding controlling the orientations of liquid crystal molecules using electric fields may also find application in implementations that incorporate liquid crystal droplets embedded within a transparent polymer matrix.

Any discussion, description, or drawing in this document regarding a single panel utilizing liquid crystal material(s), with or without it's controlling electrodes, with or without a single or dual polarizers at its faces, with a continuous (regular) or polymer dispersed LC construction, should be regarded also as dual or multi panel construction, in which light rays pass both or all of the panels in series. The LC panels for the dual or multi-panel constructions may be parallel or tilted relative to each other.

Privacy Maintaining Windows

Figure 10:
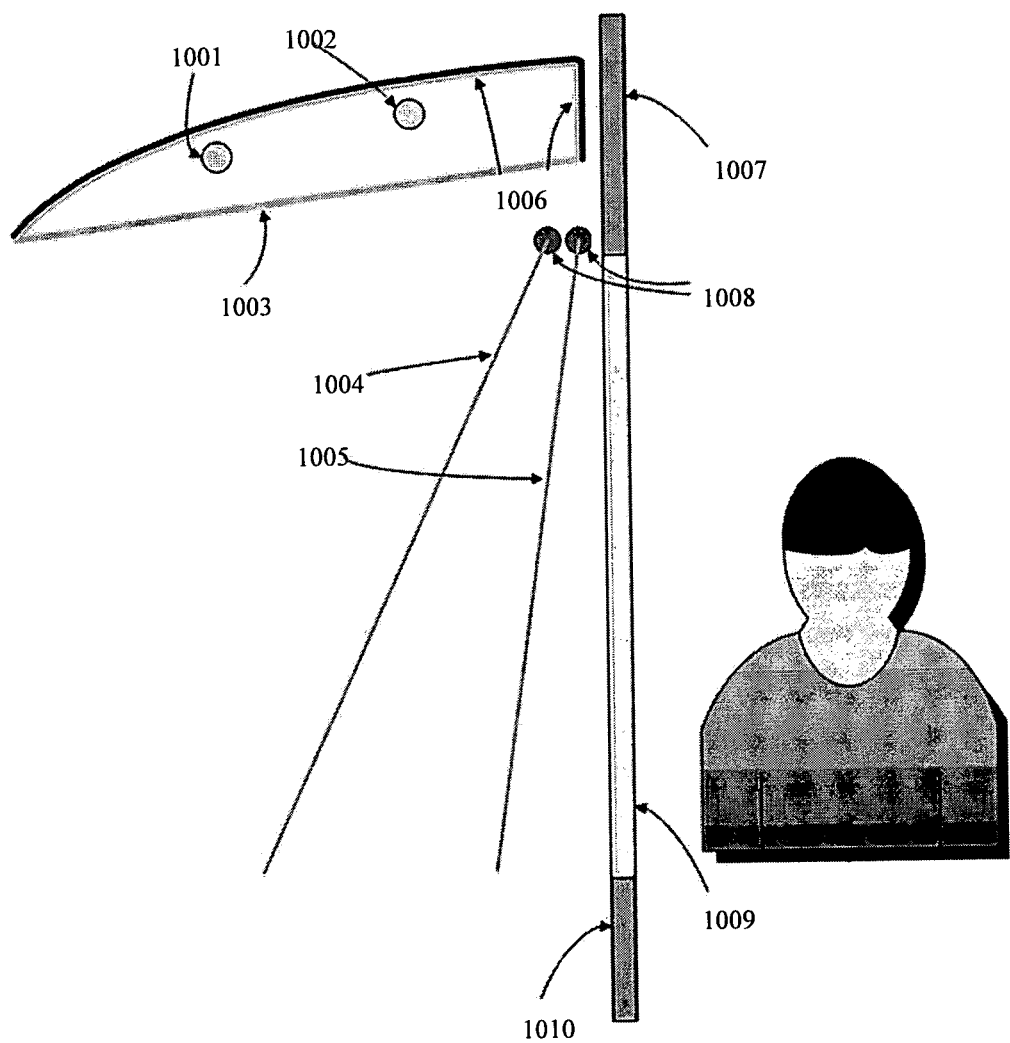
FIG. 10 illustrates an example of a privacy-maintaining window.

Reference is now made to FIG. 10 which illustrates another embodiment of the present invention. In this embodiment of the invention a window is illustrated that allows an occupant of a room to observe the outside scene while blocking the inside scene from the outside world. This is in principle a form of one-way window. The operation is based upon reflection of incoming light from the transparent or partially mirrored surfaces shown in the figure.

The principle is to use reflection of light from transparent or slightly mirrored glass or plastic sheet or sheets 1004, 1005. The light source(s) 1001,1002 is placed outside the window in places that interfere little with the view through the window.

After being reflected and/or diffused by the fixture 1006, and/or diffused by sheet 1003, the light then reaches a clear or partially mirrored sheet or sheets of transparent glass or plastic 1004, 1005 that are located outside the window (the "reflective sheets"). These are advantageously supplied with couplings 1008 for attachment to the wall 1007. Some of the light is reflected from the surface (or surfaces) of these sheets in directions away from the house (and away from the window's frame).

The brightness of the reflected light from the "reflective" sheets is much higher than the brightness level of the view of the room from outside the house. This is achieved by using a high enough level of illumination of the external light source and by having enough mirror coating at the reflective sheets.

The reflective sheets produce glare that interferes with the view through the window 1009, when observing the inside of the room from the outside. However an occupant of the room will be able to see outside easily. This is due to the fact that the light rays that originate from the external light source and that are reflected by the "reflective" sheets, advance only (or mostly) away from the house. The person(s) inside the house can watch the view through the window without being subjected to this glare.

The aforementioned lamp (the "external lamp") contains some light diffusing element (diffused reflectors, and/or translucent—matt glass or plastic panel, and/or diffused primary light source such as an array of fluorescent tubes). The said external light therefore reaches the "reflective sheets" from many directions and thus reflects towards many external directions.

The invention claimed is:

1. A directional filter device for controlling direction of maximal blocking of incident light, comprising:
    (a) a front polarizer;
    (b) a plurality of front electrodes;
    (c) a liquid crystal layer having a front surface for receiving light and a back surface for emitting light;
    (d) a plurality of back electrodes;
    (e) a back polarizer; and
    (f) circuitry for applying a voltage between said front electrodes and said back electrodes, wherein said circuitry is configured to apply voltage between front and back electrodes that do not face each other using voltage sequences that create electric fields at angles selected from a range of angles, which are not perpendicular to the front surface of the liquid crystal layer.

2. The directional filter of claim 1, adapted to selectively block the light incident upon an optical instrument selected from a group consisting of: camera lens, still camera, video camera, sunglasses, vehicle windshield visor, vehicle visor, motorcyclist helmet visor, welding helmet, window, and smart window.

3. The directional filter of claim 1, wherein said voltage sequences are applied in time periods less than a mechanical rotational time constant of molecules of said liquid crystal.

4. The directional filter of claim 1, wherein said voltage sequences applied to the front and back electrodes alternate between several phases so as to induce at molecules of the liquid crystal alternating rotational torques in a rate fast enough relative to a rotational response time of the liquid crystal molecules so that the spatial orientations of the long axes of said molecules will be stable in time.

5. The directional filter of claim 1, wherein said voltage sequences applied to said front and back electrodes alternate in several temporal phases so as to induce on molecules of said liquid crystal alternating rotational torques that orient the long axes of said molecules in a uniform desired spatial direction throughout the volume of the said liquid crystal layer.

6. The directional filter of claim 1, wherein said front and back electrodes each assume two-dimensional configurations of rows and columns, and wherein said control circuit addresses electrodes belonging to a given row together and applies a single common voltage to all said electrodes of said given row in a given phase, and in other temporal phases, electrodes belonging to a same column are addressed together and supplied with a common voltage, allowing for two-dimensional control over said direction of maximal blocking of incident light.

7. The directional filter of claim 1, wherein said directional filter is additionally provided with a direction-sensitive light detector in communication with said circuitry, said circuitry being adapted to utilize the direction and intensity information obtained from said direction-sensitive light detector to change said direction of maximal blocking of incident light.

8. The directional filter of claim 1, wherein a first spatial axis of the electric field and subsequent liquid crystal alignment is controlled by applying directional fields using a spatial pattern of voltages in a plane of said first axis, while a second spatial axis of the electric field pattern and subsequent liquid crystal alignment is controlled by applying directional fields using a spatial pattern of voltages in the plane of said second axis.

9. The directional filter of claim 1, wherein said electrodes are spaced from said liquid crystal.

10. The directional filter of claim 1, comprising separation layers which separate said electrodes from said liquid crystal.

11. The directional filter of claim 1, wherein an electric field magnitude and an electric field direction of the created electric field are independently controlled by said control circuitry.

12. The directional filter of claim 1, wherein said front electrodes are mounted on a glass plate.

13. The directional filter of claim 1, wherein said direction is a single arbitrary spatial angle relative to said filter.

14. The directional filter of claim 1, wherein said front electrodes are aligned at a non-zero offset relative to the back electrodes.

15. The directional filter of claim 1, comprising a light sensor and control circuitry which receives a signal from said sensor and which drives said circuitry to adjust (a) the direction of maximal blocking of incident light and/or (b) an attenuation level of incident light.

16. The directional filter of claim 1, wherein the electrodes take the form of parallel conductive strips.

17. A method of selectively controlling the directions of light blocking and transmission in a liquid crystal-based directional filter device, comprising:
  providing a liquid crystal-based directional filter device, comprising:
    (a) a front polarizer;
    (b) a plurality of front electrodes;
    (c) a liquid crystal layer having a front surface for receiving light and a back surface for emitting light;
    (d) a plurality of back electrodes ;
    (e) a back polarizer; and
    (f) circuitry for applying a voltage between said front electrodes and said back electrodes, characterized in that said circuitry is configured to apply voltage between front and back electrodes that do not face each other using voltage sequences that create electric fields at angles selected from a range of angles, which are not perpendicular to the front surface of the liquid crystal layer; and
  controlling the electric field direction and magnitude within the liquid crystal layer to provide said electric field at an angle which is not perpendicular to the front surface of the liquid crystal layer.

18. A method according to claim 17, wherein said controlling the electric field direction and magnitude is performed by a user.

19. A method according to claim 17, wherein said controlling the electric field direction and magnitude is performed using an input from a light sensor.

20. A method according to claim 17, wherein said controlling the electric field direction and magnitude comprises controlling said electric field in two dimensions.

* * * * *